(12) United States Patent
David et al.

(10) Patent No.: US 12,705,047 B2
(45) Date of Patent: Aug. 11, 2026

(54) SYSTEMS AND METHODS FOR USING A MOBILE DEVICE TO MANAGE AN OVER-THE-AIR VEHICLE SOFTWARE UPDATE

(71) Applicant: PACCAR Inc, Bellevue, WA (US)

(72) Inventors: Adrian David, Kent, WA (US); Alan Yip, Kent, WA (US); Chad Maxwell, Seattle, WA (US); Hilario Koyama, Bothell, WA (US); Andrew P. Harbach, Argyle, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 16/206,727

(22) Filed: Nov. 30, 2018

(65) Prior Publication Data

US 2020/0174778 A1 Jun. 4, 2020

(51) Int. Cl.
*G06F 8/654* (2018.01)
*G06F 9/451* (2018.01)
(Continued)

(52) U.S. Cl.
CPC .............. *G06F 8/654* (2018.02); *G06F 9/451* (2018.02); *G06F 11/1433* (2013.01);
(Continued)

(58) Field of Classification Search
None
See application file for complete search history.

(56) References Cited

U.S. PATENT DOCUMENTS 5,278,759 A 1/1994 Berra et al.
5,394,327 A 2/1995 Simon, Jr. et al.
(Continued)

FOREIGN PATENT DOCUMENTS

CN 101080697 B 4/2010
CN 202887167 U 4/2013
(Continued)

OTHER PUBLICATIONS

JP2018-155779 Specification, Massahi Miura (Year: 2018).*
(Continued)

*Primary Examiner* — Jason D Mitchell
(74) *Attorney, Agent, or Firm* — Merchant & Gould, P.C.

(57) ABSTRACT

In some embodiments, techniques for initiating over-the-air software updates for a vehicle using a mobile computing device are provided. In some embodiments, the vehicle and the mobile computing device each communicate with a server computing system, but do not communicate directly with each other for software update functionality. The vehicle transmits messages indicating one or more vehicle state conditions to the server computing system. The mobile computing device receives messages indicating one or more vehicle state conditions from the server computing system, and presents an interface for initiating the software update in response to determining that the vehicle state conditions indicate that the vehicle is ready for a software update. The mobile computing device transmits a command to the server computing system to cause the software update to be initiated on the vehicle, and the server computing system transmits the command to the vehicle.

20 Claims, 14 Drawing Sheets

(51) Int. Cl.
*G06F 11/14* (2006.01)
*G07C 5/00* (2006.01)
*H04L 67/00* (2022.01)
*H04L 67/12* (2022.01)
*H04W 4/80* (2018.01)
*G06F 21/31* (2013.01)

(52) U.S. Cl.
CPC .............. *G07C 5/008* (2013.01); *H04L 67/12* (2013.01); *H04L 67/34* (2013.01); *H04W 4/80* (2018.02); *G06F 21/31* (2013.01)

(56) References Cited

U.S. PATENT DOCUMENTS 5,442,553 A 8/1995 Parillo
5,490,064 A 2/1996 Minowa et al.
5,896,566 A 4/1999 Averbuch et al.
5,922,037 A 7/1999 Potts
6,181,994 B1 1/2001 Colson et al.
6,243,627 B1 6/2001 Ozeki
6,253,122 B1 6/2001 Razavi et al.
6,370,455 B1 4/2002 Larson et al.
6,434,455 B1 8/2002 Snow et al.
6,457,076 B1 9/2002 Cheng et al.
6,487,717 B1 11/2002 Brunemann et al.
6,628,233 B2 9/2003 Knockeart et al.
6,677,854 B2 1/2004 Dix
6,678,591 B2 1/2004 Ohmura et al.
6,820,259 B1 11/2004 Kawamata et al.
6,839,614 B1 1/2005 Timko et al.
6,954,687 B2 10/2005 Taguchi et al.
6,959,173 B2 * 10/2005 Kawai .................... H04W 4/00 455/421
6,965,326 B2 11/2005 Allison
6,975,612 B1 12/2005 Razavi et al.
6,978,198 B2 12/2005 Shi
7,142,962 B1 11/2006 Pflieger et al.
7,233,814 B2 6/2007 Wissinger et al.
7,272,475 B2 9/2007 Gawlik et al.
7,280,900 B2 10/2007 Gault et al.
7,349,769 B2 3/2008 Hayashi et al.
7,366,589 B2 4/2008 Habermas
7,506,309 B2 3/2009 Schaefer
7,558,603 B2 7/2009 Kadel et al.
7,623,853 B2 11/2009 Vikse et al.
8,190,322 B2 5/2012 Lin et al.
8,311,507 B2 11/2012 Wheatley et al.
8,336,042 B2 12/2012 Touati et al.
8,386,589 B2 2/2013 Keefe et al.
8,498,771 B2 7/2013 Dwan et al.
8,559,910 B2 10/2013 Yi et al.
8,655,541 B2 2/2014 You
8,688,313 B2 4/2014 Margol et al.
8,713,299 B2 4/2014 Quinn et al.
8,768,537 B2 7/2014 Kim et al.
8,875,123 B2 10/2014 Shiba
8,880,289 B2 11/2014 Uehara
8,930,067 B1 1/2015 Green et al.
8,965,627 B2 2/2015 Murakami
8,972,712 B2 3/2015 Braunberger
8,996,232 B2 3/2015 Dwan et al.
9,086,941 B1 * 7/2015 Siegel ...................... G06F 8/65
9,092,489 B1 * 7/2015 Dasilva ............ G06F 16/24578
9,128,798 B2 9/2015 Hoffman et al.
9,240,081 B2 1/2016 Ko
9,253,200 B2 2/2016 Schwarz et al.
9,274,786 B2 3/2016 Ji
9,361,090 B2 6/2016 Elzein
9,374,355 B2 6/2016 Schwarz et al.
9,443,358 B2 9/2016 Breed
9,464,905 B2 10/2016 Lewis
9,524,160 B2 12/2016 Takahashi et al.
9,529,580 B2 12/2016 Vangelov et al.
9,529,584 B2 12/2016 Eling
9,557,981 B2 1/2017 Throop et al.
9,575,743 B1 2/2017 Chun
9,626,175 B2 4/2017 Davey et al.
9,672,025 B2 6/2017 Martin et al.
9,705,990 B2 7/2017 Kresse et al.
9,720,680 B2 8/2017 Diedrich et al.
9,722,781 B2 8/2017 Smereka et al.
11,215,735 B2 * 1/2022 McArthur ............... H04L 67/12
2001/0002814 A1 6/2001 Suganuma et al.
2002/0019877 A1 2/2002 Wrede
2002/0065698 A1 5/2002 Schick et al.
2002/0110146 A1 8/2002 Thayer et al.
2003/0093199 A1 5/2003 Mavreas
2003/0188303 A1 10/2003 Barman et al.
2003/0195951 A1 10/2003 Wittel, Jr. et al.
2003/0232619 A1 12/2003 Fraser
2004/0111188 A1 6/2004 McClure et al.
2004/0192189 A1 9/2004 Yuhara et al.
2004/0214599 A1 10/2004 Ogino
2005/0090941 A1 4/2005 Stefan et al.
2006/0130033 A1 6/2006 Stoffels et al.
2009/0024991 A1 * 1/2009 Campbell ............... H04L 69/14 717/173
2009/0216885 A1 * 8/2009 Brunswig .............. G06Q 10/00 709/227
2009/0319502 A1 * 12/2009 Chalouhi .............. H04L 67/104
2010/0082559 A1 4/2010 Sumcad et al.
2011/0010387 A1 * 1/2011 Chalouhi ............ G06F 16/1834 711/216
2013/0124009 A1 * 5/2013 Esler ..................... H04L 67/125 701/2
2014/0052330 A1 2/2014 Mitchell et al.
2014/0059534 A1 2/2014 Daum et al.
2014/0109075 A1 * 4/2014 Hoffman ............ G06F 11/1464 717/169
2014/0165159 A1 * 6/2014 Baade ..................... H04L 63/08 726/4
2014/0293059 A1 * 10/2014 Park ...................... H04W 4/029 348/158
2014/0308902 A1 * 10/2014 Ricci ....................... G06F 16/25 455/66.1
2014/0380296 A1 12/2014 Pal et al.
2015/0088370 A1 3/2015 Vangelov
2015/0133108 A1 * 5/2015 Ahmed ................... H04W 4/80 455/420
2015/0186548 A1 7/2015 Chun et al.
2015/0212807 A1 * 7/2015 Elzein ..................... H04L 67/34 717/173
2015/0230044 A1 * 8/2015 Paun ....................... H04L 67/12 455/41.2
2015/0242198 A1 8/2015 Tobolski et al.
2015/0248491 A1 * 9/2015 Tashiro .................. G06Q 30/02 707/770
2015/0331686 A1 11/2015 Petersen et al.
2015/0347121 A1 * 12/2015 Harumoto ........... H04L 67/2871 717/172
2015/0363210 A1 12/2015 Wehrman et al.
2015/0363797 A1 12/2015 Ramesh
2016/0013934 A1 * 1/2016 Smereka ............... G06F 21/572 713/171
2016/0086390 A1 * 3/2016 Berkobin ............... G07C 5/008 701/1
2016/0098266 A1 4/2016 Martin et al.
2016/0196132 A1 * 7/2016 Searle ................... H04L 41/082 717/173
2016/0210131 A1 * 7/2016 Vangelov .................. G06F 8/65
2016/0259637 A1 * 9/2016 Kumar .................. H04W 8/245
2016/0323416 A1 11/2016 Wolf
2016/0335073 A1 11/2016 Hong
2016/0366247 A1 * 12/2016 Lewis ................... H04L 9/3226
2016/0371075 A1 12/2016 Moeller et al.
2016/0371077 A1 12/2016 Moeller et al.
2017/0039059 A1 2/2017 Gintz et al.
2017/0046884 A1 2/2017 Liu et al.
2017/0055258 A1 * 2/2017 Fujiwara .............. A61B 5/0004
2017/0075678 A1 3/2017 Kurosawa et al.
2017/0118023 A1 4/2017 Gussen et al.
2017/0123782 A1 5/2017 Choi
2017/0132534 A1 * 5/2017 Darnell ............... H04W 12/041

(56) References Cited

U.S. PATENT DOCUMENTS

| | | | | |
|---|---|---|---|---|
| 2017/0180391 | A1 | 6/2017 | Hinchliffe et al. | |
| 2017/0242678 | A1 | 8/2017 | Sangameswaran et al. | |
| 2017/0242679 | A1 | 8/2017 | Sangameswaran et al. | |
| 2017/0310742 | A1* | 10/2017 | Jain | H04L 67/101 |
| 2017/0316621 | A1* | 11/2017 | Jefferies | G07B 15/00 |
| 2018/0004956 | A1* | 1/2018 | Bertorelle | H04L 63/0853 |
| 2018/0067631 | A1* | 3/2018 | Thiercelin | G06F 9/451 |
| 2018/0072162 | A1* | 3/2018 | Liu | G06F 8/65 |
| 2018/0091930 | A1* | 3/2018 | Jefferies | H04L 63/08 |
| 2018/0093623 | A1* | 4/2018 | Terwilliger | G08G 1/052 |
| 2018/0246711 | A1* | 8/2018 | Kurosawa | B60K 35/00 |
| 2018/0349126 | A1* | 12/2018 | Hempel | H04R 25/30 |
| 2019/0018964 | A1* | 1/2019 | Basehore | G06F 21/74 |
| 2019/0108010 | A1* | 4/2019 | Tillman | H04L 67/12 |
| 2019/0155998 | A1* | 5/2019 | Yamaguchi | G06Q 50/10 |
| 2019/0220265 | A1* | 7/2019 | Willis | H04W 76/10 |
| 2019/0279440 | A1* | 9/2019 | Ricci | H04W 4/48 |
| 2019/0294429 | A1* | 9/2019 | Mizutani | G06F 11/00 |
| 2020/0037129 | A1* | 1/2020 | Mezaael | H04W 4/029 |
| 2020/0065087 | A1* | 2/2020 | Miura | B60R 16/023 |
| 2020/0089487 | A1* | 3/2020 | Ramic | G06F 8/61 |
| 2020/0174778 | A1* | 6/2020 | David | H04W 4/80 |
| 2023/0123408 | A1* | 4/2023 | Sharma | H04L 67/34 717/173 |

FOREIGN PATENT DOCUMENTS

| | | | |
|---|---|---|---|
| CN | 103136020 | A | 6/2013 |
| CN | 103399760 | A | 11/2013 |
| CN | 103957244 | A | 7/2014 |
| CN | 104090800 | A | 10/2014 |
| CN | 104539668 | A | 4/2015 |
| CN | 104978205 | A | 10/2015 |
| CN | 105094932 | A | 11/2015 |
| CN | 105278994 | A | 1/2016 |
| CN | 105282250 | A | 1/2016 |
| CN | 105468385 | A | 4/2016 |
| CN | 105589719 | A | 5/2016 |
| CN | 103136001 | B | 6/2016 |
| CN | 105700905 | A | 6/2016 |
| CN | 105824653 | A | 8/2016 |
| CN | 105978921 | A | 9/2016 |
| CN | 106052699 | A | 10/2016 |
| CN | 106066800 | A | 11/2016 |
| CN | 106383757 | A | 2/2017 |
| CN | 106385420 | A | 2/2017 |
| CN | 106411967 | A | 2/2017 |
| CN | 106506649 | A | 3/2017 |
| CN | 106528207 | A | 3/2017 |
| CN | 106656565 | A | 5/2017 |
| CN | 106850839 | A | 6/2017 |
| CN | 106934868 | A | 7/2017 |
| DE | 10 2004 052 782 | B4 | 12/2007 |
| DE | 10 2007 062 160 | A1 | 6/2009 |
| DE | 10 2005 021 103 | B4 | 10/2013 |
| DE | 10 2014 221 972 | A1 | 5/2016 |
| DE | 10 2015 207 852 | A1 | 11/2016 |
| DE | 10 2016 006 701 | A1 | 12/2016 |
| DE | 10 2015 219 837 | A1 | 4/2017 |
| DE | 10 2004 064 292 | B3 | 5/2017 |
| DE | 10 2016 201 279 | A1 | 8/2017 |
| EP | 2 041 632 | B1 | 5/2012 |
| EP | 2 424 745 | B1 | 4/2013 |
| EP | 3 141 974 | A1 | 3/2017 |
| EP | 1 324 197 | B1 | 4/2017 |
| FR | 2 865 301 | B1 | 1/2005 |
| GB | 2536360 | A | 9/2016 |
| JP | 2001-67232 | A | 3/2001 |
| JP | 2017-149323 | A | 8/2017 |
| JP | 6185789 | B2 | 8/2017 |
| JP | 2017-157003 | A | 9/2017 |
| KR | 10-2001-0027466 | A | 4/2001 |
| KR | 100739142 | B1 | 7/2007 |
| KR | 100853124 | B1 | 8/2008 |
| KR | 101316970 | B1 | 10/2013 |
| KR | 10-2014-0086159 | A | 7/2014 |
| KR | 10-2014-0105159 | A | 9/2014 |
| KR | 10-2015-0144623 | A | 12/2015 |
| KR | 101600460 | B1 | 3/2016 |
| KR | 10-1619645 | B1 | 5/2016 |
| KR | 10-2017-0094765 | A | 8/2017 |
| SE | 1051247 | A1 | 6/2012 |
| TW | 201537465 | A | 10/2015 |
| WO | 98/21077 | A1 | 5/1998 |
| WO | 01/71306 | A1 | 9/2001 |
| WO | 02/17184 | A1 | 2/2002 |
| WO | 03/077205 | A2 | 9/2003 |
| WO | 2016/142101 | A1 | 9/2016 |
| WO | 2017/010859 | A1 | 1/2017 |
| WO | 2017/149824 | A1 | 9/2017 |
| WO | 2018/079006 | A1 | 5/2018 |

OTHER PUBLICATIONS

European Extended Search Report in Application 19888692.1, mailed Jun. 22, 2022, 9 pages.

PCT International Search Report and Written Opinion in Application PCT/US2019/063886, mailed Mar. 5, 2020, 8 pages.

PCT International Preliminary Report on Patentability in Application PCT/US2019/063886, mailed Jun. 10, 2021, 8 pages.

* cited by examiner

Figure 3A:
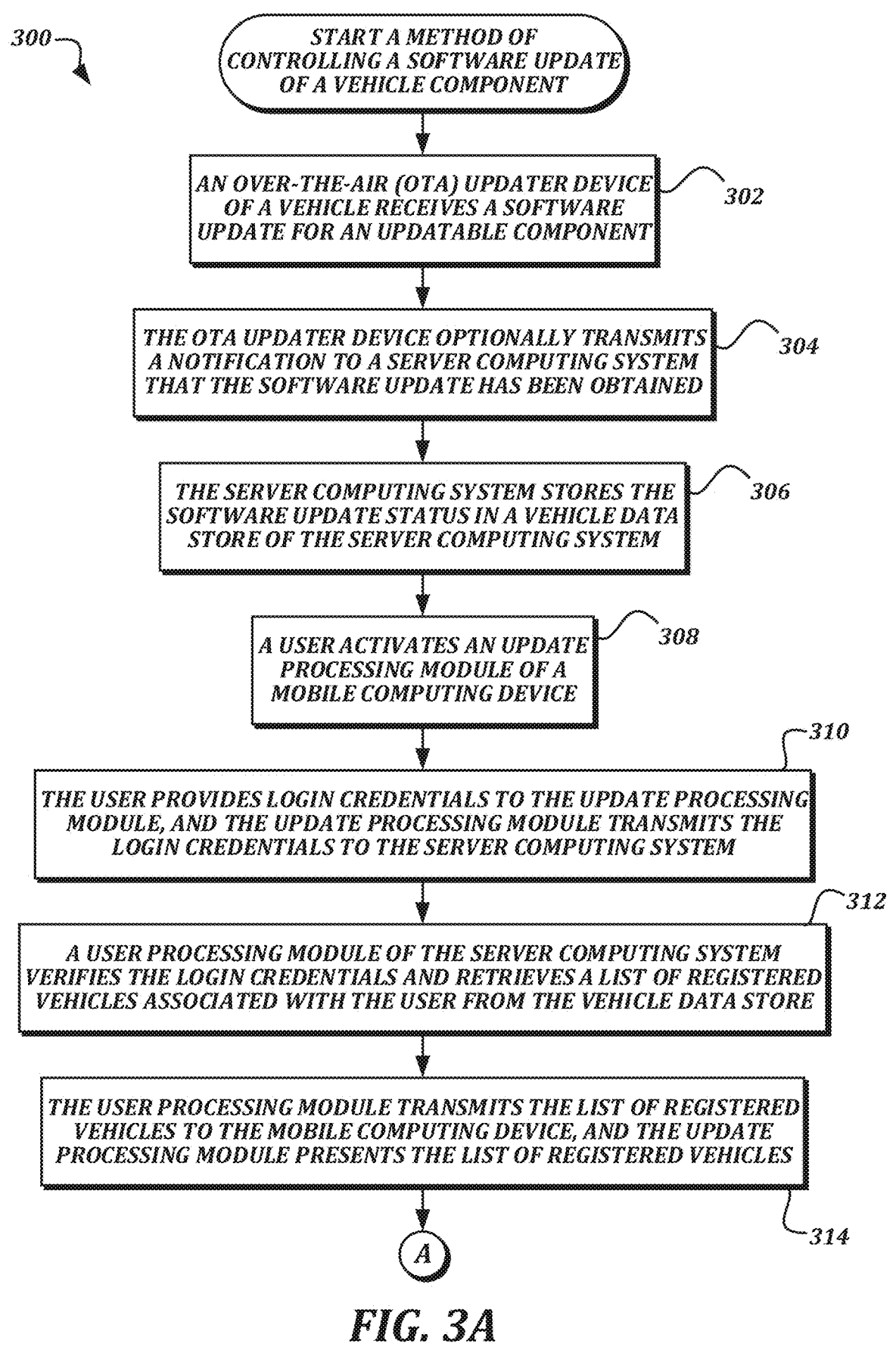

300

START A METHOD OF CONTROLLING A SOFTWARE UPDATE OF A VEHICLE COMPONENT

AN OVER-THE-AIR (OTA) UPDATER DEVICE OF A VEHICLE RECEIVES A SOFTWARE UPDATE FOR AN UPDATABLE COMPONENT — 302

THE OTA UPDATER DEVICE OPTIONALLY TRANSMITS A NOTIFICATION TO A SERVER COMPUTING SYSTEM THAT THE SOFTWARE UPDATE HAS BEEN OBTAINED — 304

THE SERVER COMPUTING SYSTEM STORES THE SOFTWARE UPDATE STATUS IN A VEHICLE DATA STORE OF THE SERVER COMPUTING SYSTEM — 306

A USER ACTIVATES AN UPDATE PROCESSING MODULE OF A MOBILE COMPUTING DEVICE — 308

THE USER PROVIDES LOGIN CREDENTIALS TO THE UPDATE PROCESSING MODULE, AND THE UPDATE PROCESSING MODULE TRANSMITS THE LOGIN CREDENTIALS TO THE SERVER COMPUTING SYSTEM — 310

A USER PROCESSING MODULE OF THE SERVER COMPUTING SYSTEM VERIFIES THE LOGIN CREDENTIALS AND RETRIEVES A LIST OF REGISTERED VEHICLES ASSOCIATED WITH THE USER FROM THE VEHICLE DATA STORE — 312

THE USER PROCESSING MODULE TRANSMITS THE LIST OF REGISTERED VEHICLES TO THE MOBILE COMPUTING DEVICE, AND THE UPDATE PROCESSING MODULE PRESENTS THE LIST OF REGISTERED VEHICLES — 314

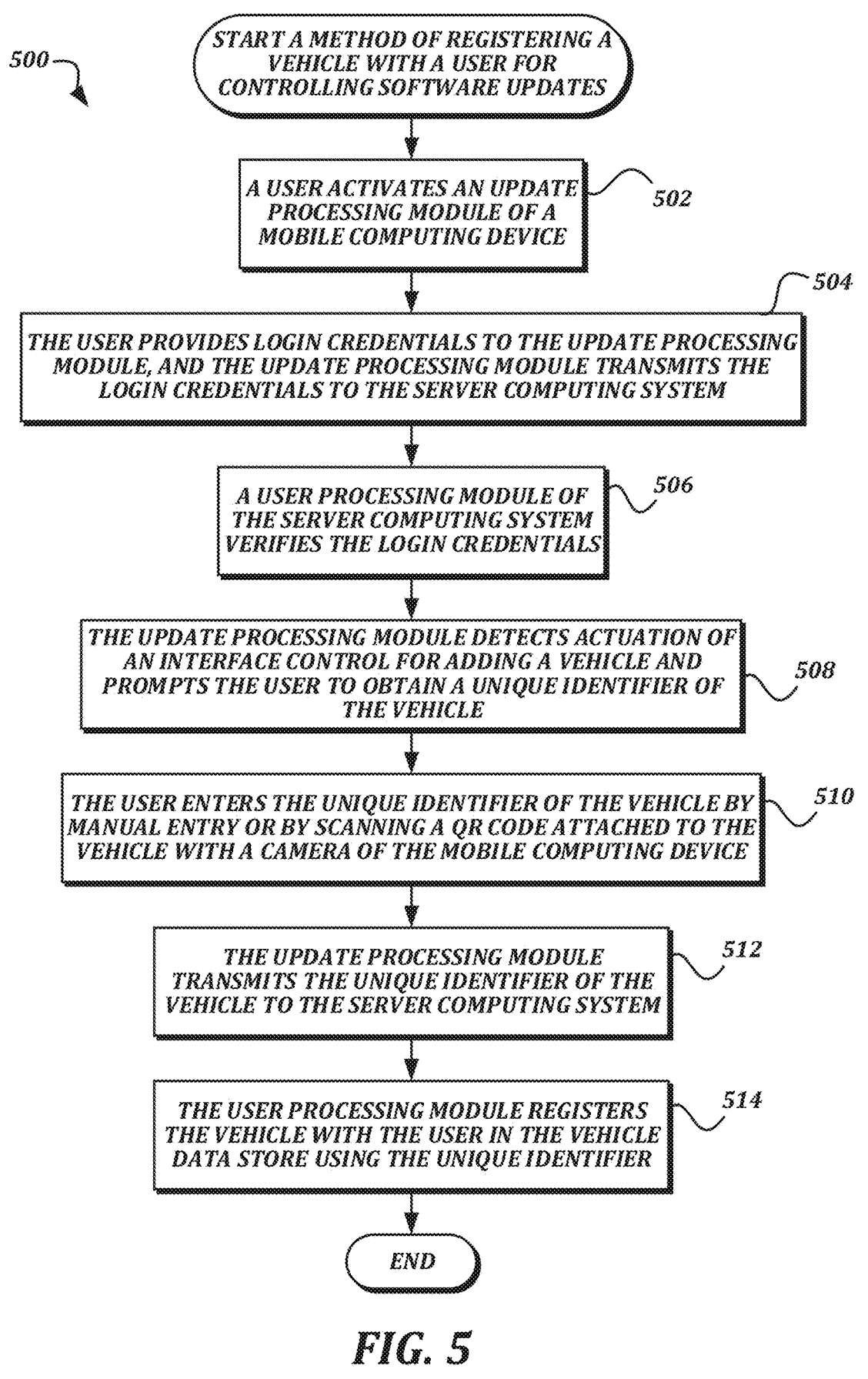

START A METHOD OF REGISTERING A VEHICLE WITH A USER FOR CONTROLLING SOFTWARE UPDATES

502 — A USER ACTIVATES AN UPDATE PROCESSING MODULE OF A MOBILE COMPUTING DEVICE

504 — THE USER PROVIDES LOGIN CREDENTIALS TO THE UPDATE PROCESSING MODULE, AND THE UPDATE PROCESSING MODULE TRANSMITS THE LOGIN CREDENTIALS TO THE SERVER COMPUTING SYSTEM

506 — A USER PROCESSING MODULE OF THE SERVER COMPUTING SYSTEM VERIFIES THE LOGIN CREDENTIALS

508 — THE UPDATE PROCESSING MODULE DETECTS ACTUATION OF AN INTERFACE CONTROL FOR ADDING A VEHICLE AND PROMPTS THE USER TO OBTAIN A UNIQUE IDENTIFIER OF THE VEHICLE

510 — THE USER ENTERS THE UNIQUE IDENTIFIER OF THE VEHICLE BY MANUAL ENTRY OR BY SCANNING A QR CODE ATTACHED TO THE VEHICLE WITH A CAMERA OF THE MOBILE COMPUTING DEVICE

512 — THE UPDATE PROCESSING MODULE TRANSMITS THE UNIQUE IDENTIFIER OF THE VEHICLE TO THE SERVER COMPUTING SYSTEM

514 — THE USER PROCESSING MODULE REGISTERS THE VEHICLE WITH THE USER IN THE VEHICLE DATA STORE USING THE UNIQUE IDENTIFIER

END

*FIG. 5*

SYSTEMS AND METHODS FOR USING A MOBILE DEVICE TO MANAGE AN OVER-THE-AIR VEHICLE SOFTWARE UPDATE

BACKGROUND

Modern-day vehicles include increasing amounts of software. Software is often essential to the proper functioning of the vehicle. In many cases, software is updated from time to time in order to ensure that the vehicle is operating correctly, and/or to reconfigure vehicle functionality that is only changeable by updating the software. This is true in many types of vehicles, including but not limited to Class 8 trucks, other classes of trucks, farm equipment, buses, and passenger cars.

Electronic control units (ECUs) and other devices associated with the vehicles may store or access updatable software, which may include computer-executable instructions, settings data, torque maps, or other software. ECUs are embedded devices that control electronic systems or subsystems in vehicles. ECUs provide many types of functionality for vehicle operation, including but not limited to engine control, auxiliary equipment control, presentation of information via an instrument panel, and infotainment services. ECUs can be implemented in a variety of hardware configurations. A typical ECU includes a processor (e.g., a microcontroller), memory, input/output lines, and one or more communication links. The memory may include an electronically erasable, programmable, read-only memory ("EEPROM") or other non-volatile memory (e.g., flash memory) and/or random access memory ("RAM") for storing program instructions that are accessible by the processor.

Typically, vehicle software stored on the ECU is updated by coupling a specialized device (sometimes referred to as a flash tool or service tool) to a physical communication port of the vehicle, such as an OBD-II port. Once coupled to the physical communication port, the specialized device transmits the software update to the device to be updated via a vehicle network such as a CAN BUS or another type of network, and the device is updated. In order to apply the software update using this approach, the vehicle must be taken to a dealership, service center, or other location that offers software update services using the specialized device. Dealerships and service centers where such updates can be installed may not always be closely available to the vehicle, and application of the updates may take an inconvenient amount of time. For example, during a trip, a vehicle requiring such a software update may need to change its route, resulting in a change in itinerary and a possible delay in the installation of critical updates.

To address these limitations, over-the-air updates have been introduced in which vehicle software on the ECU can be updated wirelessly, without physically connecting the vehicle to a specialized device. In some embodiments, over-the-air updates can be delivered to the vehicle from an update server via a wireless network. The wireless network may be a private wireless network such as a protected Wi-Fi network, or could be a public network such as a 3G network, a 4G network, an LTE network, or any other wireless network, including the Internet. Such embodiments address many of the drawbacks of using a specialized device to update the vehicle software, because the vehicle can be updated at any location in which the vehicle can wirelessly access a network through which it can reach the update server.

Though over-the-air updates do address some of the problems with using a specialized device to provide vehicle software updates, technical problems exist in implementing such systems. For example, using a public network to deliver and/or otherwise manage software updates to a vehicle opens a vector of attack through which an unauthorized actor could attempt to install unapproved, malicious, or otherwise unwanted software updates. As such, ensuring the security of the software update process is a significant technical problem. As another example, allowing software updates to occur outside of a dealership or service center means that the person initiating the software update may not be fully trained or experienced in applying software updates the way a technician in a dealership or service center is. This introduces an additional technical problem, in that the safety and reliability of applying an over-the-air software update is reduced compared to previous techniques that were only performed by skilled technicians.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an over-the-air updater device for installation in a vehicle is provided. The over-the-air updater device comprises one or more processors, one or more remote network interfaces, one or more vehicle network interfaces, and a non-transitory computer-readable medium having computer-executable instructions stored thereon. The instructions, in response to execution by the one or more processors, cause the over-the-air updater device to perform actions comprising transmitting messages via the one or more remote network interfaces to a mobile computing device via a server computing system indicating one or more vehicle state conditions; and, in response to receiving a command from the mobile computing device via the server computing system to install an update to software stored on at least one non-transitory computer-readable medium accessible via the one or more vehicle network interfaces, transmitting a signal via the one or more vehicle network interfaces to initiate the update.

In some embodiments, a non-transitory computer-readable medium is provided. The computer-readable medium has computer-executable instructions stored thereon that, in response to execution by one or more processors of a mobile computing device, cause the mobile computing device to perform actions comprising: receiving, from an update server, a message indicating one or more vehicle state conditions; and, in response to determining that the one or more vehicle state conditions indicate that the vehicle is ready for a software update: presenting an interface element for initiating the software update; and in response to detecting actuation of the interface element, transmitting an instruction to the update server to initiate the software update on the vehicle.

In some embodiments, a method of causing an over-the-air updater device of a vehicle to initiate a software update is provided. An update server receives a notification from the over-the-air updater device that a software update has been downloaded. The update server receives a first message indicating one or more vehicle state conditions from the over-the-air updater device. The update server transmits a second message indicating the one or more vehicle state conditions to the mobile computing device. The update server receives an instruction from the mobile computing device to initiate the software update. The update server transmits the instruction to the over-the-air updater device to initiate the software update.

DESCRIPTION OF THE DRAWINGS

Non-limiting and non-exhaustive embodiments of the present disclosure are described with reference to the following figures, wherein:

FIGS. 3A-3C describe an example method for controlling a software update of a vehicle component according to one or more aspects of the present disclosure;

FIG. 5 is a flowchart that illustrates an example embodiment of a method of registering a vehicle to be associated with a user for controlling software updates according to one or more aspects of the present disclosure.

DETAILED DESCRIPTION

As will be described in more detail below, embodiments of the present disclosure generally relate to systems, devices, and methods wherein a mobile computing device is used to manage an over-the-air update of software within a vehicle. The vehicle and the mobile computing device each communicate wirelessly with a server computing system, which acts as an intermediary between the mobile computing device and the vehicle. One or more prerequisites, including but not limited to whether an initiation device has been actuated, whether an engine of the vehicle is off, whether an ignition key of the vehicle is on, whether a battery of the mobile computing device and/or the vehicle has a sufficient level of charge, and whether a parking brake is set, are checked by the server computing system, the vehicle, and/or the mobile computing device before allowing the update to be initiated.

Embodiments of the present disclosure address the technical problems discussed above in multiple ways. In some embodiments, the mobile computing device does not communicate directly with the vehicle, but instead the vehicle and the mobile computing device communicate via the server computing system. Using this communication topology allows the server computing system to authenticate the mobile computing device and/or a user thereof before allowing interaction with the vehicle, thus providing a way of securing the system from access by unauthorized actors. In some embodiments, security of the over-the-air updates is further improved by initiating the software update using both the mobile computing device and an HMI device within the vehicle. This ensures both that the user and/or the mobile computing device are authorized to initiate the software update, and that the user is physically present within the vehicle for initiation (instead of attempting to update the vehicle from a remote location, from which the user cannot know whether the vehicle is in a safe condition to perform the update). Further, the various prerequisite checks performed by the mobile computing device and/or the vehicle improve safety, in that users with low levels of experience and/or training in applying software updates are prevented from initiating updates when the vehicle is in an unsafe state. Embodiments of the present disclosure also reduce the service down-time and eliminate the added fuel usage caused by diverting a vehicle to a dealership or service center for updates Eliminating this diversion also reduces cost, because a user with less training and experience can safely and securely initiate the software updates.

Figure 1:
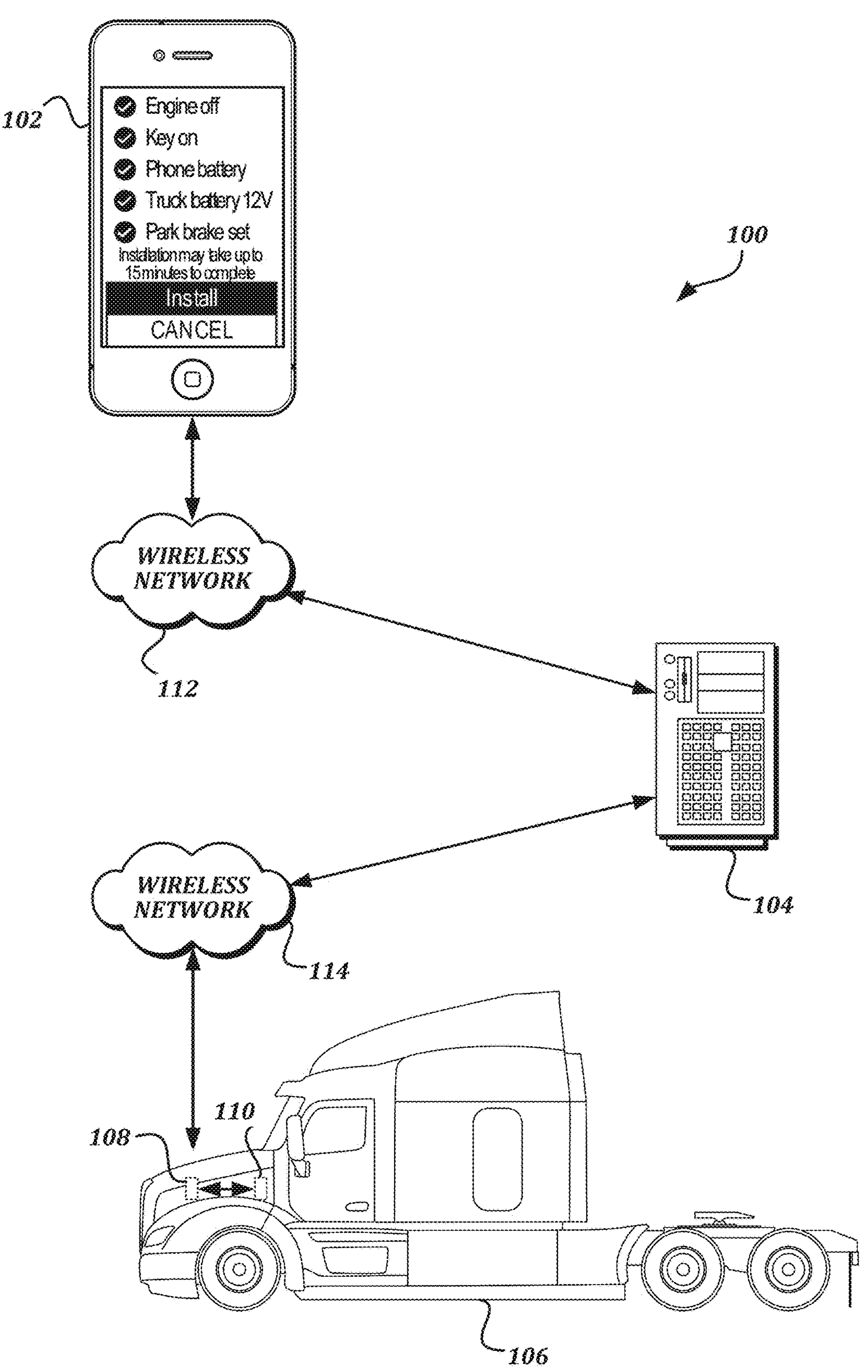
FIG. 1 is a schematic diagram of an example embodiment of an environment in which over-the-air software updates for components of a vehicle are performed according to one or more aspects of the present disclosure.

FIG. 1 is a schematic diagram of an example embodiment of an environment in which over-the-air software updates for components of a vehicle are performed according to one or more aspects of the present disclosure. The term "over-the-air" refers in general to communication with the vehicle 106 via one or more wireless networks instead of via a physical connection between the vehicle 106 and an update device. Accordingly, over-the-air updates of a vehicle can be performed at any location where the vehicle has a communication link to the one or more wireless networks, without requiring the vehicle to be located at a dealership or service center. As shown, the environment 100 includes a vehicle 106, a server computing system 104, and a mobile computing device 102.

The vehicle 106 includes an over-the-air updater device 108 and one or more updatable components 110. The over-the-air updater device 108 communicates with the server computing system 104 via a first wireless network 114. The first wireless network 114 may include one or more types of wireless communication technology, including but not limited to a 2G wireless network, a 3G wireless network, a 4G wireless network, an LTE wireless network, a Wi-MAX wireless network, a Wi-Fi wireless network, a satellite-based wireless network, or any suitable network capable of wirelessly transmitting software updates. In some embodiments, some portions of the first wireless network 114, such as a portion of the first wireless network 114 that is coupled to the server computing system 104, may include wired communication technology including but not limited to an Ethernet local-area network or the Internet. Even in such embodiments, the connection between the vehicle 106 and the first wireless network 114 will be via a portion of the first wireless network 114 that includes a wireless communication technology.

The mobile computing device 102 communicates with the server computing system 104 via a second wireless network 112. In some embodiments, the second wireless network 112 may include one or more wireless communication technologies similar to the first wireless network 114, including but not limited to a 2G wireless network, a 3G wireless network, a 4G wireless network, an LTE wireless network, a Wi-MAX wireless network, a Wi-Fi wireless network, a satellite-based wireless network, or any suitable network capable of wirelessly transmitting software updates. In some embodiments, some portions of the second wireless network 112, such as a portion of the second wireless network 112 that is coupled to the server computing system 104, may include wired communication technology including but not limited to an Ethernet local-area network or the Internet. Even in such embodiments, the connection between the mobile computing device 102 and the second wireless network 112 may be via a portion of the second wireless network 112 that includes a wireless communication technology. In some embodiments, the mobile computing device 102 may be connected to the server computing system 104 via a wired communication technology without departing from the scope of the present disclosure.

In some embodiments, the first wireless network 114 and the second wireless network 112 may be separate from each other. In some embodiments, at least some portions of the first wireless network 114 and the second wireless network 112 may overlap. For example, both the mobile computing device 102 and the vehicle 106 may connect to the same Wi-Fi access point or cell phone tower, or separate Wi-Fi access points on a shared local area network, to access their respective wireless networks. However, in all embodiments, the mobile computing device 102 communicates directly with the server computing system 104, and the vehicle 106 communicates directly with the server computing system 104, but the mobile computing device 102 and the vehicle 106 do not communicate directly with each other for the management of software updates. Instead, all interaction between the mobile computing device 102 and the vehicle 106 is relayed by the server computing device 104, even if the mobile computing device 102 and the vehicle 106 are connected to overlapping wireless networks. In some embodiments, the mobile computing device 102 and the vehicle 106 may communicate with each other for some purposes unrelated to software updates, such as for hands-free operation of the mobile computing device 102 for communication, for navigation, or for streaming media from the mobile computing device 102 to an infotainment system of the vehicle 106 for playback (e.g., using voice commands or HMI devices of the vehicle 106 to instruct the mobile computing device 102 to make calls, stream music, access maps, etc.). However, any interaction between the mobile computing device 102 and the vehicle 106 related to managing software updates on the vehicle 106 is mediated by the server computing system 104, even if the mobile computing device 102 and the vehicle 106 are capable of communicating directly for other purposes.

Figure 2A:
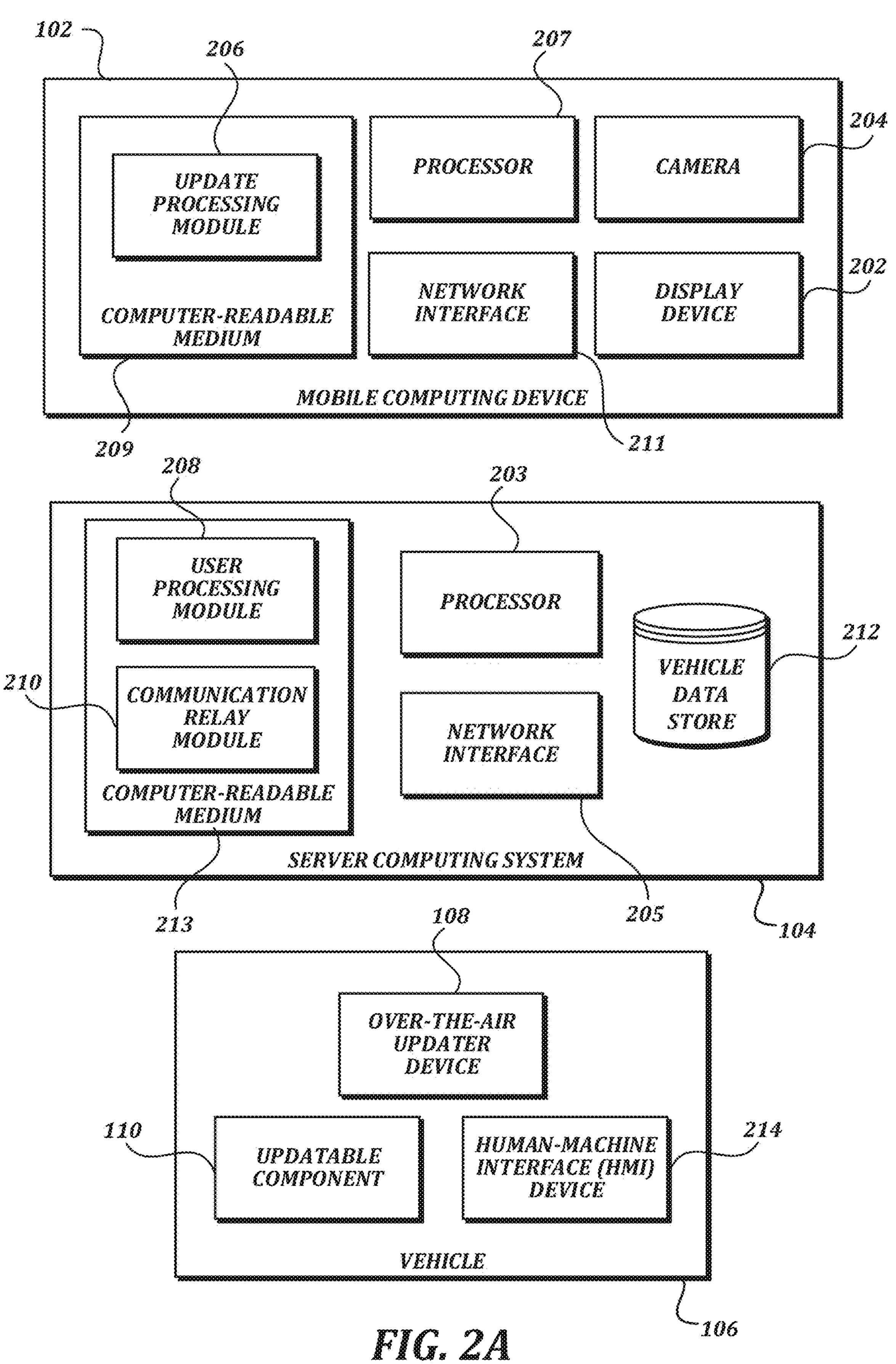
FIGS. 2A and 2B are block diagrams that illustrate details of various components of the environment illustrated in FIG. 1 according to one or more aspects of the present disclosure.
Figure 2B:
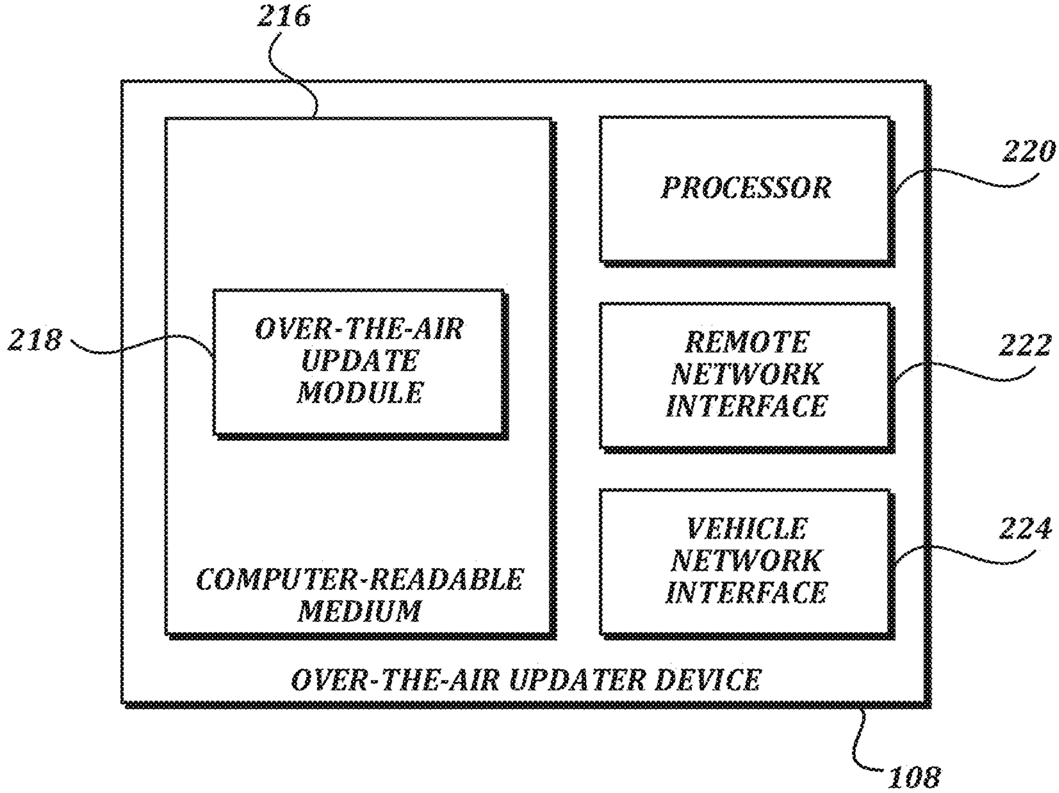

FIGS. 2A and 2B are block diagrams that illustrate details of various components of the environment illustrated in FIG. 1 according to one or more aspects of the present disclosure. As shown in FIG. 2A (and as previously shown in FIG. 1), the environment includes a mobile computing device 102, a server computing system 104, and a vehicle 106.

The mobile computing device 102 is any computing device capable of communicating with the server computing system 104. In some embodiments, the mobile computing device 102 is a smartphone, such as an Apple iPhone, a Google Android device, a Samsung Galaxy S device, a Samsung Galaxy Note device, or the like. In some embodiments, the mobile computing device 102 is a tablet computing device, such as an Apple iPad. Though the mobile computing device 102 will typically be a highly portable device such as the devices described above, these examples should not be seen as limiting. In other embodiments, the mobile computing device 102 may be a laptop computing device or other suitable device.

As shown, the mobile computing device 102 includes a display device 202, a camera 204, one or more processors 207, one or more network interfaces 211, and a computer-readable medium 209. In some embodiments, the display device 202 is a screen such as an OLED device, an AMOLED device, or other suitable display device. In some embodiments, the display device 202 is also touch sensitive, such that a user can interact with information presented on the display device 202 using touches such as tapping, holding, swiping, and dragging. In some embodiments, the camera 204 (which may or may not be present) is a device configured to capture video and/or images, and to provide the video and/or images to other components of the mobile computing device 102 for further processing. In some embodiments, the one or more network interfaces 211 may include at least one wireless network interface, including but not limited to a cellular network interface, a Wi-Fi interface, and a Bluetooth interface. The one or more network interfaces 211 allow the mobile computing device 102 to communicate with at least the second wireless network 112. In some embodiments, the at least one processor 207 may include one or more general-purpose CPUs, one or more special-purpose processors (including but not limited to graphics processors), or other types of processors. The at least one processor 207 executes computer-executable instructions stored on the computer-readable medium 209. The computer-readable medium 209 may be any suitable computer-readable medium, including but not limited to a flash memory, and may store an update processing module 206. In some embodiments, the update processing module 206 is configured to communicate with the server computing system 104 and to present various interfaces via the display device 202 as illustrated and described further below.

In general, the word "module," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, Swift, Go, and/or the like. A module may be compiled into executable programs or written in interpreted programming languages. Software modules may be callable from other modules or from themselves. Generally, the modules described herein refer to logical modules that can be merged with other modules, or can be divided into modules. As a non-limiting example, in some embodiments, the user processing module 208 and the communication relay module 210 may be combined into a single module. The modules can be stored in any type of computer-readable medium or computer storage device and be stored on and executed by one or more processors of an ECU or other computing device, thus creating a special purpose computer configured to provide the module. Thus, the term "module" as used herein may be shorthand for one or more processors and a computer-readable medium having computer-executable instructions stored thereon that, in response to execution by the one or more processors, cause the one or more processors to perform the actions described as being performed by the module.

In some embodiments, the server computing system 104 includes one or more computing devices capable of communicating with the first wireless network 114 and the second wireless network 112 and performing the actions below. Any suitable computing devices may be used. Typically, the computing devices of the server computing system 104 include desktop computing devices, rack-mounted computing devices, and/or cloud computing systems. In some embodiments, the computing devices of the server computing system 104 are hosted in a single data center. In some embodiments, the computing devices of the server computing system 104 are located in more than one data center, and communicate with each other via one or more networks.

As shown, the server computing system 104 includes a computer-readable medium 213 that stores a user processing module 208 and a communication relay module 210, one or more processors 203, one or more network interfaces 205, and a vehicle data store 212. In some embodiments, the user processing module 208 authenticates users connecting to the server computing system 104 via mobile computing devices 102 in order to permit them to interact with the server computing system 104. In some embodiments, the user processing module 208 provides functionality for associating users with vehicles 106, and may also verify that an authenticated user of a mobile computing device 102 is associated with a vehicle 106 they are attempting to update. In some embodiments, instead of or in addition to associating users with vehicles 106, the user processing module 208 may provide functionality for associating mobile computing device 102 with vehicles 106, and may also verify that a given mobile computing device 102 is associated with a vehicle 106 it is being used to update. In some embodiments, the user processing module 208 queries a vehicle data store 212—which stores the associations between vehicles 106 and users, between vehicles 106 and mobile computing devices 102, or both—for vehicles associated with an authenticated user or a given mobile computing device 102. A list of the associated vehicles is then provided by the user processing module 208 to the appropriate mobile computing device 102.

A "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner, such as files in a file system, on a computer-readable storage medium, as described further below.

In some embodiments, the communication relay module 210 receives transmissions from the vehicle 106, determines an appropriate mobile computing device 102 to receive the transmission, and sends a transmission based on the transmission from the vehicle 106 to the mobile computing device 102. The communication relay module 210 may also receive transmissions from the mobile computing device 102 intended for the vehicle 106, and may send transmissions based on the transmissions from the mobile computing device 102 to the vehicle 106.

In some embodiments, the one or more processors 203 may include any suitable processor, including but not limited to a general purpose CPU, a graphics processor, and other types of processors. The one or more processors 203 execute computer-executable instructions stored on the computer readable medium 213. In some embodiments, the one or more network interfaces 205 may include a wired interface including but not limited to an Ethernet interface, a USB interface, a FireWire interface, or other type of wired interface. In some embodiments, the one or more network interfaces 205 may include a wireless interface including but not limited to a Wi-Fi interface, a 3G interface, a 4G interface, an LTE interface, a Bluetooth interface, or another type of wireless interface.

The server computing system 104 is illustrated in a single box, and in some embodiments, may be implemented using a single computing device. In some embodiments, multiple computing devices may be used to provide the server computing system 104. In such embodiments, the components of the server computing system 104 illustrated in FIG. 2A may be duplicated amongst the computing devices and load may be balanced between the computing devices, or some components may be present on some computing devices and some components may be present on other computing devices. For example, a first computing device (or set of computing devices) may provide the user processing module 208, while a second computing device (or set of computing devices) provides the communication relay module 210, and a third computing device (or set of computing devices) provides the vehicle data store 212. In some embodiments, at least some components of the server computing system 104 may be provided in a cloud service or using a virtual server instead of being provided by a dedicated computing device.

As stated above, the vehicle 106 may be any type of vehicle that includes updatable software. In some embodiments, the vehicle 106 is a Class 8 truck. In some embodiments, the vehicle 106 is another type of vehicle, such as another class of truck, a bus, a passenger car, a motorcycle, etc. As shown, the vehicle 106 includes an over-the-air (OTA) updater device 108, an updatable component 110, and a human-machine interface (HMI) device 214. Though not illustrated, the components of the vehicle 106 communicate with each other in some embodiments using a vehicle communication bus. Any suitable vehicle communication bus, such as a controller area network (CAN) bus, may be used.

In some embodiments, the OTA updater device 108 performs actions for updating software within the vehicle 106. In some embodiments, the OTA updater device 108 obtains software updates. In some embodiments, the OTA updater device 108 communicates vehicle status information to the server computing system 104. In some embodiments, the OTA updater device 108 receives commands from the server computing system 104 regarding the application of software updates, and applies the software updates in response to the commands. Further description of the OTA updater device 108 is provided below in association with FIG. 2B.

In some embodiments, the updatable component 110 is any non-transitory computer-readable medium within the vehicle 106 that has computer-executable instructions, data, or other software stored thereon that can be updated by the OTA updater device 108. In some embodiments, this computer-readable medium may be a part of another vehicle component, such as a firmware or other memory of an ECU. In some embodiments, this computer-readable medium may be a separate component, such as a flash memory. Though only a single updatable component 110 is illustrated in FIG. 2 for ease of discussion, in some embodiments, the vehicle 106 may have more than one updatable component 110.

In some embodiments, the HMI device 114 is a device that accepts input from the operator of the vehicle 106. Any suitable device may be used as the HMI device 114, including but not limited to a push button, a toggle switch, a lever, and a touch-sensitive display. In some embodiments, a dedicated HMI device 114 (such as a push button, toggle switch, lever, or touch-sensitive display interface that is only associated with the software update initiation functionality) is provided in the vehicle 106 for initiating the software update functionality as described below. In some embodiments, the status of an existing HMI device 114 within the vehicle 106 (such as a push button, toggle switch, lever, or touch-sensitive display interface that is associated with functionality of the vehicle 106 whether or not the software update initiation functionality is present in the vehicle 106) may be used to initiate the software update functionality. For example, in some embodiments, a cruise control set button may be an existing HMI device 114 that can be used to initiate software update functionality. In such embodiments, the cruise control set button may be depressed for a threshold amount of time, such as three seconds, in order to activate the functionality as described below.

FIG. 2B illustrates further details regarding components within the over-the-air (OTA) updater device 108. As shown, the OTA updater device 108 includes at least one processor 220, one or more remote network interfaces 222, one or more vehicle network interfaces 224, and a computer-readable medium 216 that stores an over-the-air update module 218 thereon. In some embodiments, the at least one processor 220 may include one or more general-purpose CPUs, one or more special-purpose processors (including but not limited to graphics processors), or other types of processors. The at least one processor 220 executes computer-executable instructions stored on the computer-readable medium 216. In some embodiments, the one or more remote network interfaces 222 may include at least one wireless network interface, including but not limited to a cellular network interface, a Wi-Fi interface, and a Bluetooth interface. The one or more remote network interfaces 222 allow the OTA updater device 108 to communicate with at least the first wireless network 114. In some embodiments, the one or more vehicle network interfaces 224 may include at least one network interface that connects the OTA updater device 108 to other components of the vehicle 106, including but not limited to the vehicle communication bus (CAN bus) described above, an Ethernet network, a USB network, a FireWire network, a wireless network local to the vehicle 106, or another network that connects components of the vehicle 106. The over-the-air update module 218 causes the OTA updater device 108 to perform actions for controlling a software update of a vehicle 106 as described below.

Figure 3B:
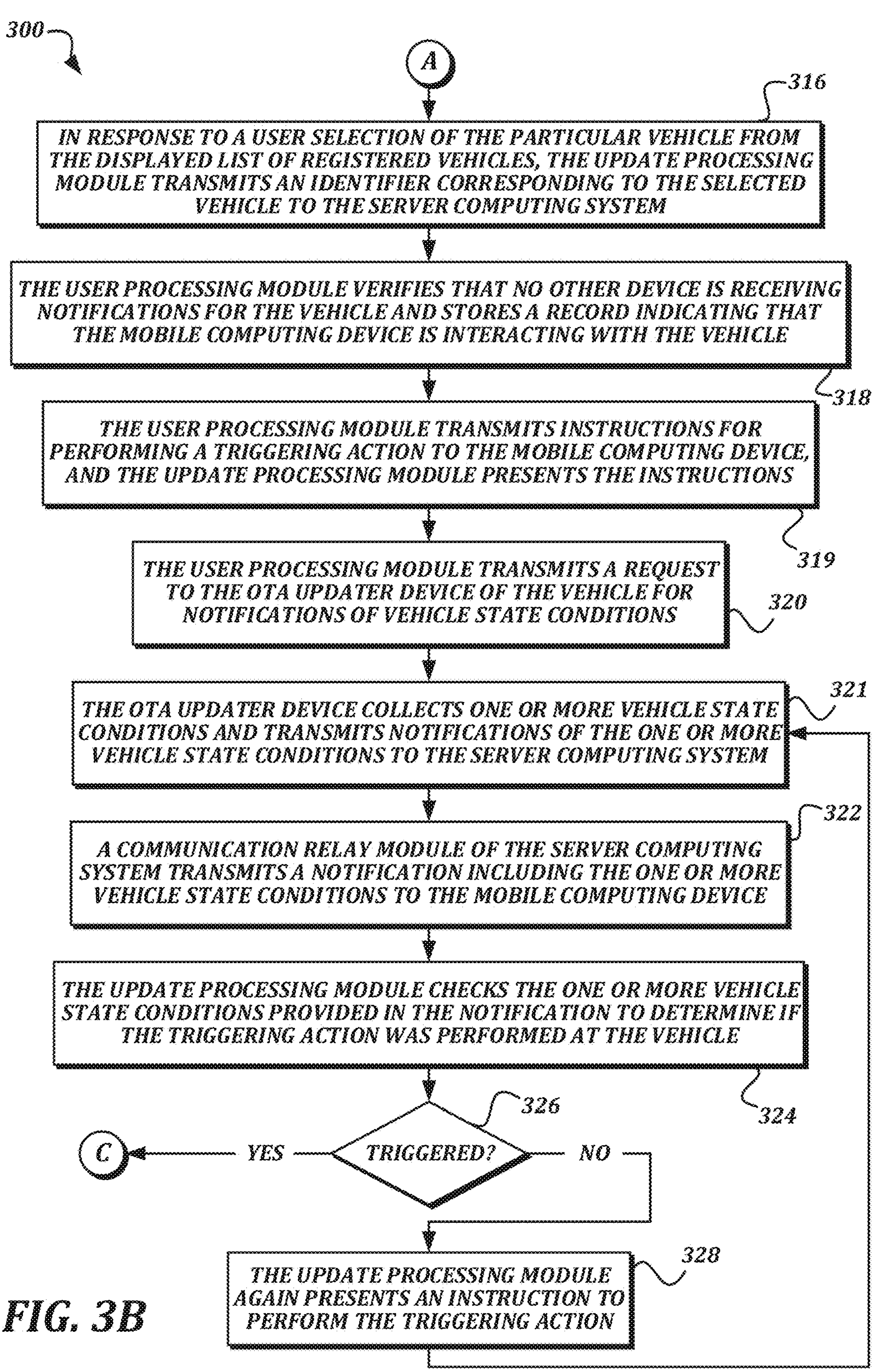
Figure 3C:
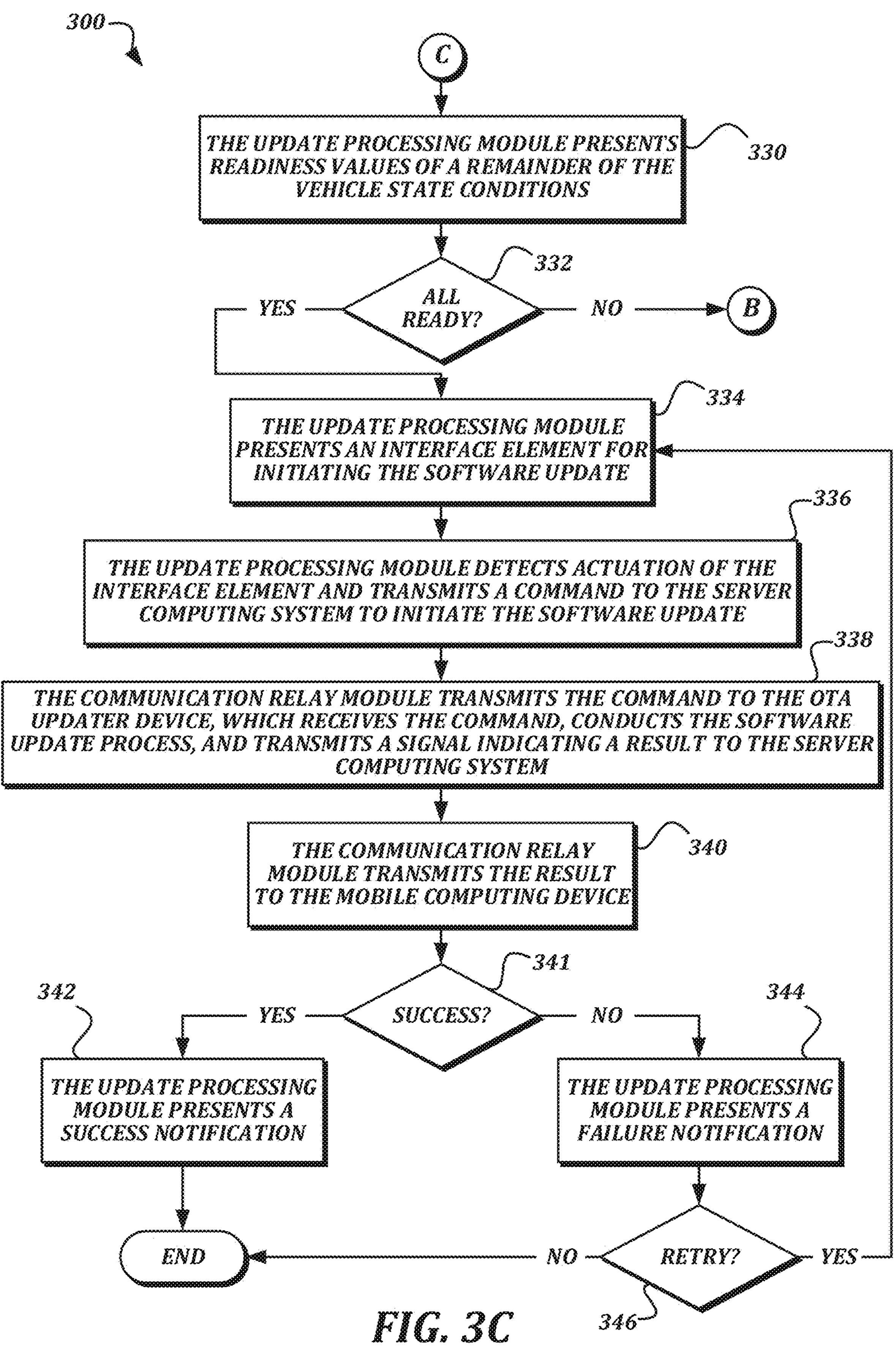

FIGS. 3A-3C describe an example method for controlling a software update of a vehicle component according to one or more aspects of the present disclosure. At block 302, an over-the-air (OTA) updater device 108 of a vehicle 106 receives a software update for an updatable component 110. In some embodiments, the software update includes computer-executable instructions, settings, data or other software that will replace or update software stored in an updatable component 110. In some embodiments, the software update may also include other information, including but not limited to version information, prerequisite information, and instructions for the OTA updater device 108 regarding how to install the software on the updatable component 110. Though the discussion herein primarily refers to obtaining a single software update for a single updatable component 110 for ease of discussion, in some embodiments, the OTA updater device 108 may obtain more than one software update for a single updatable component 110. Also, in some embodiments, the OTA updater device 108 may obtain separate software updates for multiple updatable components 110.

The OTA updater device 108 may receive the software update in a variety of manners. For example, the OTA updater device 108 may transmit a request for available updates to the server computing system 104 (or another computing system), and may receive the software update in response. As another example, the server computing system 104 (or another computing system) may push the software update to the OTA updater device 108, or may otherwise cause the OTA updater device 108 to initiate a download of the software update. As yet another example, the software update may be copied to the OTA updater device 108 from a computer-readable storage medium coupled to the vehicle 106. After obtaining the software update, the OTA updater device 108 stores the software update until application of the software update is initiated.

At block 304, the OTA updater device 108 optionally transmits a notification to a server computing system 104 that the software update has been obtained. This may be the same server computing system 104 from which the software update was obtained, or the software update may have been obtained from a different source. In some embodiments, the notification informs the server computing system 104 that the software update has been completely downloaded to allow a list of registered vehicles that includes indications of vehicles that have received a software update to be generated. If the optional notification is not transmitted, the list of registered vehicles may not include the indications of vehicles that have received software updates. At block 306, the server computing system 104 stores the software update status that indicates that the software update has been obtained by the vehicle 106 in a vehicle data store 212 of the server computing system 104.

At block 308, a user activates an update processing module 206 of a mobile computing device 102. In some embodiments, the update processing module 206 may be activated at the user's discretion, such as by manually launching an application that provides the functionality of the update processing module 206. In some embodiments, the update processing module 206 may be activated in response to a message transmitted from the server computing system 104 to the mobile computing device 102 in response to receiving and storing the notification from the OTA updater device 108. The message transmitted to the mobile computing device 102 may be a push notification including but not limited to an application-directed SMS, an iMessage, or a text SMS with a link usable to launch the update processing module 206. Alternatively, the message transmitted to the mobile computing device 102 may be another kind of message, such as an email. In some embodiments, receipt of the message causes the mobile computing device 102 to present a notification that prompts the user to launch an application that provides the functionality of the update processing module 206. In some embodiments, receipt of the message causes the mobile computing device 102 to automatically launch an application that provides the functionality of the update processing module 206.

At block 310, the user provides login credentials to the update processing module 206, and the update processing module 206 transmits the login credentials to the server computing system 104. Any suitable type of login credential may be used, including but not limited to a username and password, a value provided from a smart card, biometric information, a code generated by a key generator, and an identifier of the mobile computing device 102. In some embodiments, combinations of more than one type of login credential may be used. In some embodiments, the login credentials may include information previously entered by the user and stored by the mobile computing device 102, such as a saved username and password, or stored biometric information.

At block 312, a user processing module 208 of the server computing system 104 verifies the login credentials and retrieves a list of registered vehicles associated with the user from the vehicle data store 212. An example embodiment of a method for creating of the list of registered vehicles associated with the user is illustrated in FIG. 5 and discussed in further detail below. In some embodiments, the list of registered vehicles may include status information about each vehicle, including but not limited to whether each vehicle has received a software update that is awaiting installation. In some embodiments, the list of registered vehicles may include vehicle identification numbers (VINs) associated with each vehicle (or portions thereof), other unique identifiers of the vehicles (such as license plate numbers or other unique identifiers generated for the vehicles to associate the vehicles with records in the vehicle data store 104), and/or information to make it easier to identify a given vehicle (such as a nickname, a color, or a photograph) At block 314, the user processing module 208 transmits the list of registered vehicles to the mobile computing device 102, and the update processing module 206 presents the list of registered vehicles. Presenting may occur by displaying the list on a display device, outputting the list via a loudspeaker, or by any other presentation technique. The list of registered vehicles transmitted to the mobile computing device 102 may include identifiers corresponding to each vehicle.

At block 316 (FIG. 3B), in response to a user selection of the particular vehicle 106 from the displayed list of registered vehicles, the update processing module 206 transmits an identifier corresponding to the selected vehicle to the server computing system 104. In some embodiments, the identifier of the selected vehicle is a vehicle identification number (VIN) associated with the vehicle or a portion thereof. In some embodiments, the identifier is some other unique identifier, such as a license plate number, or a unique identifier other than the VIN that is generated for the vehicle 106 to associate the vehicle 106 with a record in the vehicle data store 104.

Figure 4A:
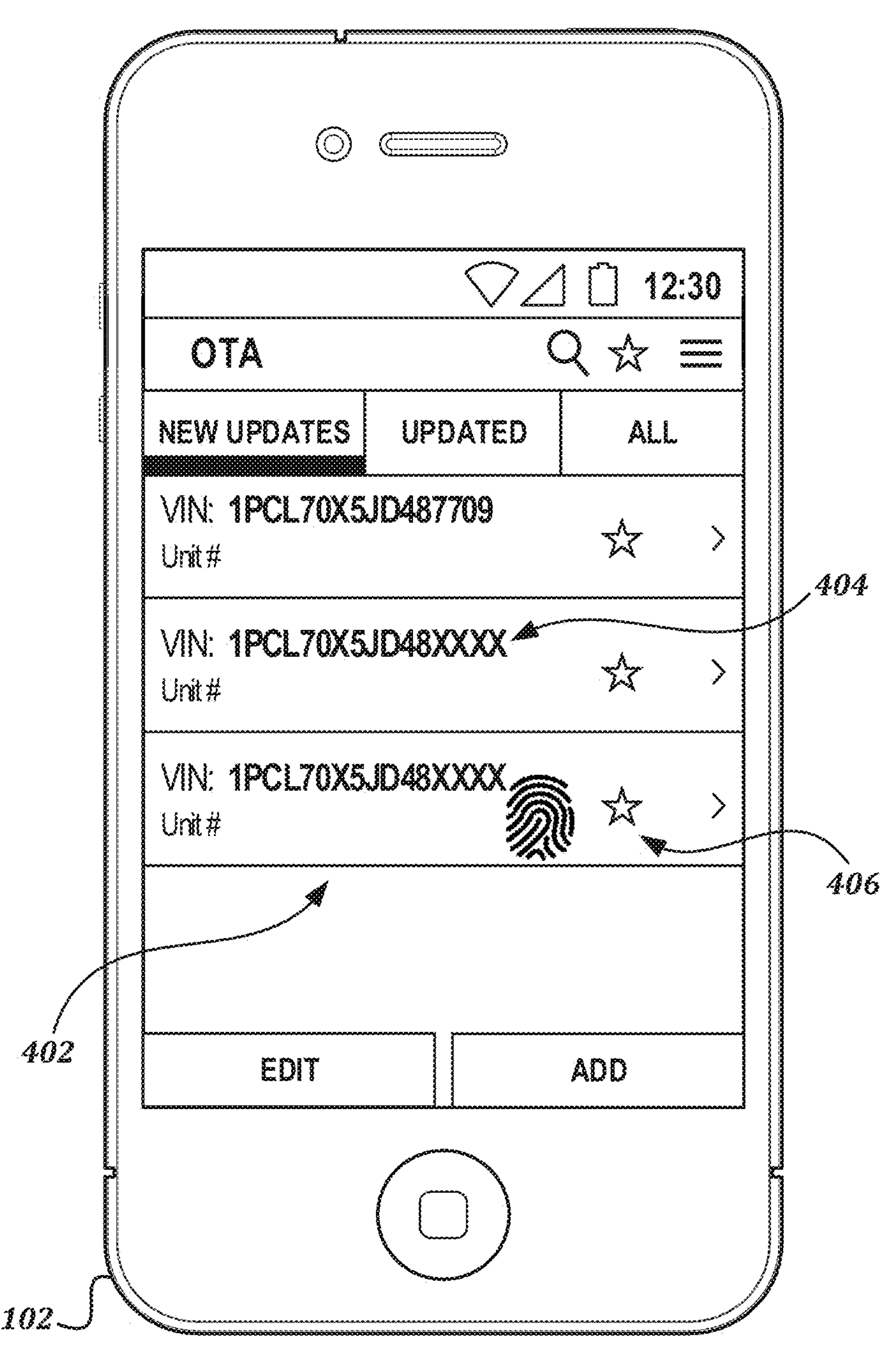
FIGS. 4A-4F illustrate example embodiments of mobile computing device user interfaces according to one or more aspects of the present disclosure.

FIG. 4A illustrates an example embodiment of a mobile computing device 102 user interface displaying a list of registered vehicles according to various aspects of the present disclosure. As shown in this example, the mobile computing device 102 displays a list of vehicles 402, including each corresponding unique identifier 404. In some embodiments, more information may be provided in order to make it easier to identify a given vehicle, such as a license plate number, a nickname, a color, or a photograph. The stars 406 in the list of vehicles may indicate whether a given vehicle has received a software update, and selecting a vehicle within the list via a tap, a swipe, a press and hold, a hard press, or other gesture may cause the selection described in block 316. In some embodiments, the illustrated interface may be used to perform a search for a specific vehicle. Alternatively or additionally, the user interface may receive an input from a camera of the mobile computing device 102 to scan an identifier such as a QR code, VIN, or license plate from the vehicle in order to detect or identify a particular vehicle within the list, or to cause the selection described in block 316.

In some embodiments, the user processing module 208 (or the communication relay module 210) keeps track of whether a mobile computing device 102 is currently interacting with the vehicle 106. A mobile computing device 102 is interacting with the vehicle 106 when it is receiving notifications from the server computing system 104 about the vehicle 106 and transmitting commands to the server computing system 104 intended for the vehicle 106. In some embodiments, the mobile computing device 102 may be considered to be interacting with the vehicle 106 between receipt of notifications and transmission of commands if the method 300 is still underway for the mobile computing device 102 and the vehicle 106. Typically, only one mobile computing device 102 will be allowed to receive the notifications and transmit commands at a time in order to avoid conflicts between the two devices. In some embodiments, multiple mobile computing devices 102 may be allowed to receive the notifications, but only a single mobile computing device 102 may be allowed to transmit commands at a time. Accordingly, at block 318 (FIG. 3B), the user processing module 208 verifies that no other device is receiving notifications and transmitting commands for the vehicle 106, and stores a record indicating that the mobile computing device 102 is interacting with the vehicle 106. The method 300 as illustrated assumes that no other device is receiving notifications and transmitting commands for the vehicle 106. However, if the user processing module 208 detected that a different device is receiving notifications and transmitting commands for the vehicle, the user processing module 208 may transmit an error notification to be presented by the mobile computing device 102, and the method 300 may terminate.

At block 319, the user processing module 208 transmits instructions for performing a triggering action to the mobile computing device 102, and the update processing module 206 presents the instructions. Presenting the instructions helps guide the user through successfully initiating the software update without requiring other training. In some embodiments, the triggering action is an action performed within the vehicle 106 to indicate that the user is present and intends to initiate the software update. In some embodiments, the triggering action may be designed to avoid inadvertent triggering. For example, the triggering action may include actuating an HMI device 214 of the vehicle 106 (such as the cruise control set button, a button dedicated to the update initiation functionality, or another HMI device 214) for at least a threshold amount of time, such as depressing a button for at least three seconds. The threshold amount of time may help ensure that an inadvertent or unrelated actuation of the HMI device 214 does not trigger the update functionality. In some embodiments, another technique could be used to avoid inadvertent triggering, such as using an input interface on an infotainment system or other touch-sensitive display that is hidden behind multiple layers of menus or that requires some other detailed input or confirmation from the user to be actuated. Using a threshold amount of time for actuating an existing HMI device 214 such as a cruise control set button has benefits in that the functionality cannot be accidentally discovered, because existing vehicle hardware can be used without changes, and because the technique is relatively simple. Another example of a technique for avoiding inadvertent triggering is determining whether an HMI device 214 that is protected from actuation by a cover, a key, or by another technique has been actuated for any amount of time. Yet another example of a technique for avoiding inadvertent triggering is determining whether a combination of HMI devices 214 were actuated at the same time, or in a predetermined sequence.

Figure 4B:
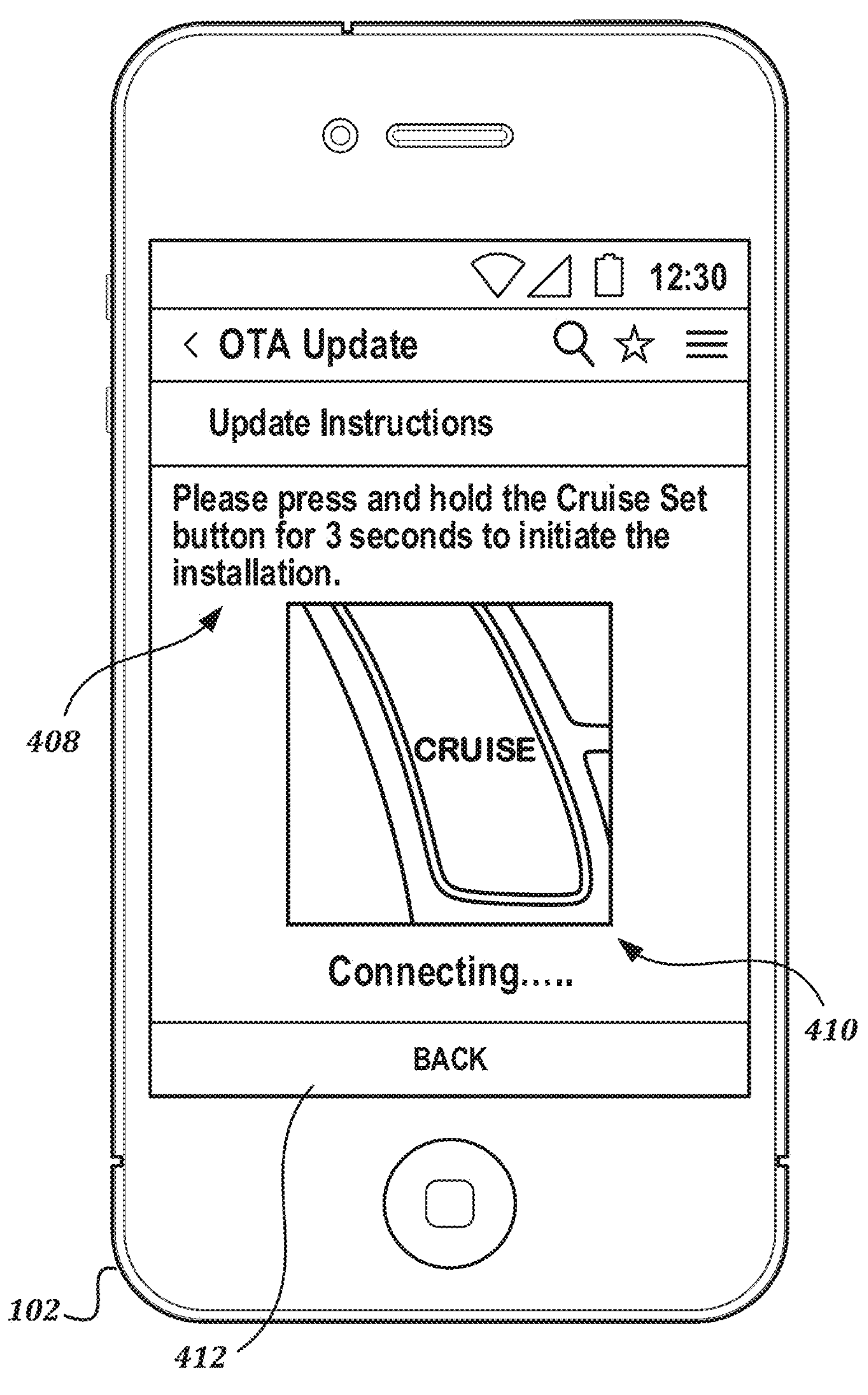

FIG. 4B illustrates an example embodiment of a mobile computing device 102 user interface displaying a set of instructions for performing a triggering action so initiate installation of the software update. As shown in this example, the interface displays text 408 instructing the user to press and hold the cruise control set button for three seconds to initiate the installation. Additionally or alternatively, a photo or illustration 410 of the cruise control set button is provided to assist the user in locating the proper button. In this example, the interface also includes a back interface control 412 to allow the user to return to the list of vehicles, in case the user no longer wishes to proceed with the software update for the selected vehicle. Although FIG. 4B illustrates a particular example instructing the user to depress the cruise control button, this example is not meant to limit the scope of the disclosure, and it is understood that any one or more combinations of buttons may be used to confirm installation of the software update.

Returning to FIG. 3B, at block 320, the user processing module 208 transmits a request to the OTA updater device 108 of the vehicle 106 for notifications of vehicle state conditions. The request sent to the OTA updater device 108 by the user processing module 208 may not identify the mobile computing device 102, because the vehicle 106 is only transmitting the notifications to the server computing system 104, and the server computing system 104 is storing a record regarding which mobile computing device 102 should receive updates generated by a given vehicle 106. In some embodiments, the requests generated by the user processing module 208 may be sent to the OTA updater device 108 by the communication relay module 210.

At block 321, the OTA updater device 108 collects one or more vehicle state conditions and transmits notifications of the one or more vehicle state conditions to the server computing system 104. Each vehicle state condition indicates a condition of the vehicle 106 that may impact whether the vehicle 106 is ready for an update. Some vehicle state conditions may indicate whether the update is likely to succeed or fail (including but not limited to whether wireless signal strength or battery levels are adequate). Some vehicle state conditions may indicate whether the vehicle 106 is in a condition in which it is safe to install the update (including but not limited to whether the vehicle 106 is parked, whether the engine of the vehicle 106 is running, or whether the user is present within the vehicle 106).

In some embodiments, the OTA updater device 108 collects the one or more vehicle state conditions by receiving information that can be used to determine the vehicle state conditions from other components of the vehicle 106 via the vehicle communication bus. The vehicle state conditions may include instantaneous values (such as a value at a time when the OTA update device 108 queries a component for the value) and may also include values that are determined over time (such as how long a particular value has been in a particular state). A non-limiting example of a vehicle state condition that may be determined over time is whether a HMI device 214 has been actuated for a threshold amount of time. Some non-limiting examples of vehicle state conditions that may be determined based on an instantaneous value include whether an engine of the vehicle 106 is running, whether an ignition of the vehicle 106 is on, whether a battery voltage of the vehicle 106 meets a battery voltage threshold, whether a wireless signal strength detected by the OTA updater device 108 meets a signal strength threshold, whether a parking brake of the vehicle 106 is set, whether the OTA updater device 108 can communicate with one or more updatable components 110 to be updated by the software update and/or the computer-readable media associated therewith, and any combination thereof.

At block 322, a communication relay module 210 of the server computing system 104 transmits a notification including the one or more vehicle state conditions to the mobile computing device 102. At block 324, the update processing module 206 checks the one or more vehicle state conditions provided in the notification to determine if the triggering action was performed at the vehicle 106. Ensuring purposeful triggering by analyzing the actuation of an HMI device 214 or other triggering signal by analyzing the vehicle state conditions from the vehicle 106 helps provide an additional layer of security, in that the software update process cannot be initiated without both being authenticated by the server computing system 104 through the mobile computing device 102, and also by having physical access to the vehicle 106 such that the HMI device 214 can be actuated. This can help prevent remote attacks on the software update process from unauthorized or malicious actors.

The method 300 then proceeds to decision block 326, where a determination is made based on whether the triggering action was performed at the vehicle 106. If the update processing module 206 determines that the triggering action was not performed at the vehicle 106, then the result of decision block 326 is NO, and the method 300 proceeds to block 328, where the update processing module 206 again presents an instruction to perform the triggering action. In some embodiments, the presentation of the instruction may be skipped, but displaying the instruction again can help guide the operator through the software update process without requiring significant training. The method 300 then returns to block 320.

Returning to decision block 326, if the HMI device has been actuated for at least the threshold amount of time, then the result of decision block 326 is YES, and the method 300 proceeds to a continuation terminal ("terminal C"). At block 330 (FIG. 3C), the update processing module 206 presents readiness values of a remainder of the vehicle state conditions. In some embodiments, the update processing module 206 may present success indicators associated with vehicle state conditions that are met, and failure indicators associated with vehicle state conditions that are not met, in order to guide the operator through preparing the vehicle 106 for the software update. In some embodiments, for vehicle state conditions that are not met, the update processing module 206 may present further information regarding how the operator can cause the conditions to be met. In some embodiments, the update processing module 206 may also check state conditions of the mobile computing device 102 itself, in addition to the vehicle state conditions. These mobile device state conditions may include but are not limited to, whether a battery level of the mobile computing device 102 meets a battery level threshold, or a wireless signal strength detected by the mobile computing device 102 meets a signal strength threshold. The success or failure states of these mobile device state conditions may also be presented, at block 330, on a display of the mobile device 102, along with information regarding how to remedy failed conditions (such as, for example, instructing the user to connect the mobile computing device 102 to a power source). These conditions may affect the determination at decision block 332, in that if one or more of the mobile device states are failed, the result of decision block 332 may be NO (as described further below).

Figure 4C:
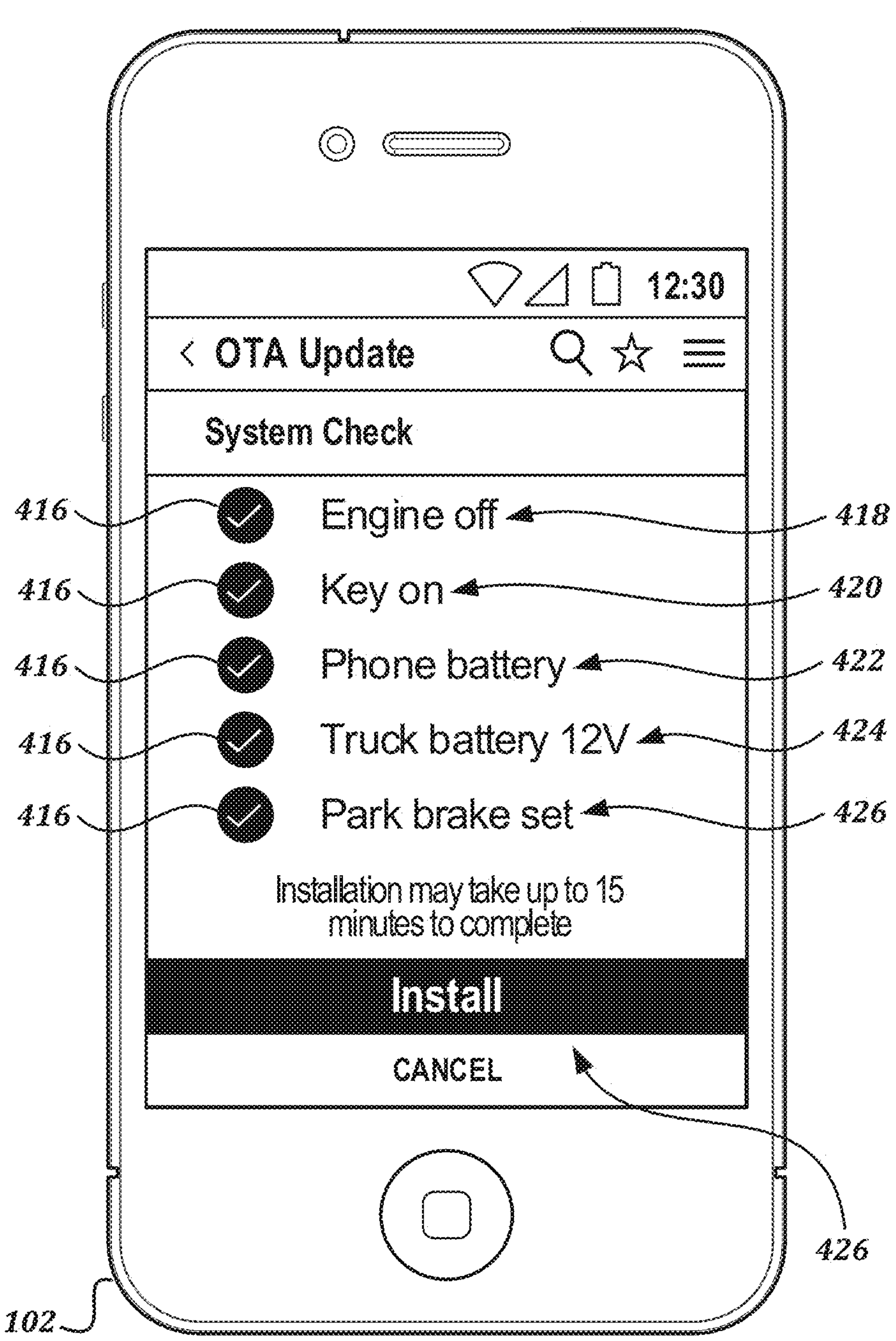

FIG. 4C illustrates an example embodiment of a mobile computing device 102 user interface displaying a success state for each of the vehicle state conditions and mobile device state conditions. As shown in this example, a checkmark 416 is presented next to indicators for an engine off vehicle state condition 418, an ignition on vehicle state condition 420, a mobile battery charge state condition 422, a vehicle battery voltage state condition 424, and a parking brake state condition 426. Alternatively, more, fewer, or different vehicle state conditions may be presented, and the interface may allow scrolling or swiping to show more vehicle state conditions than provided on the present display. The interface also includes an interface element for initiating the software update 428, which will be described in further detail, below.

Figure 4D:
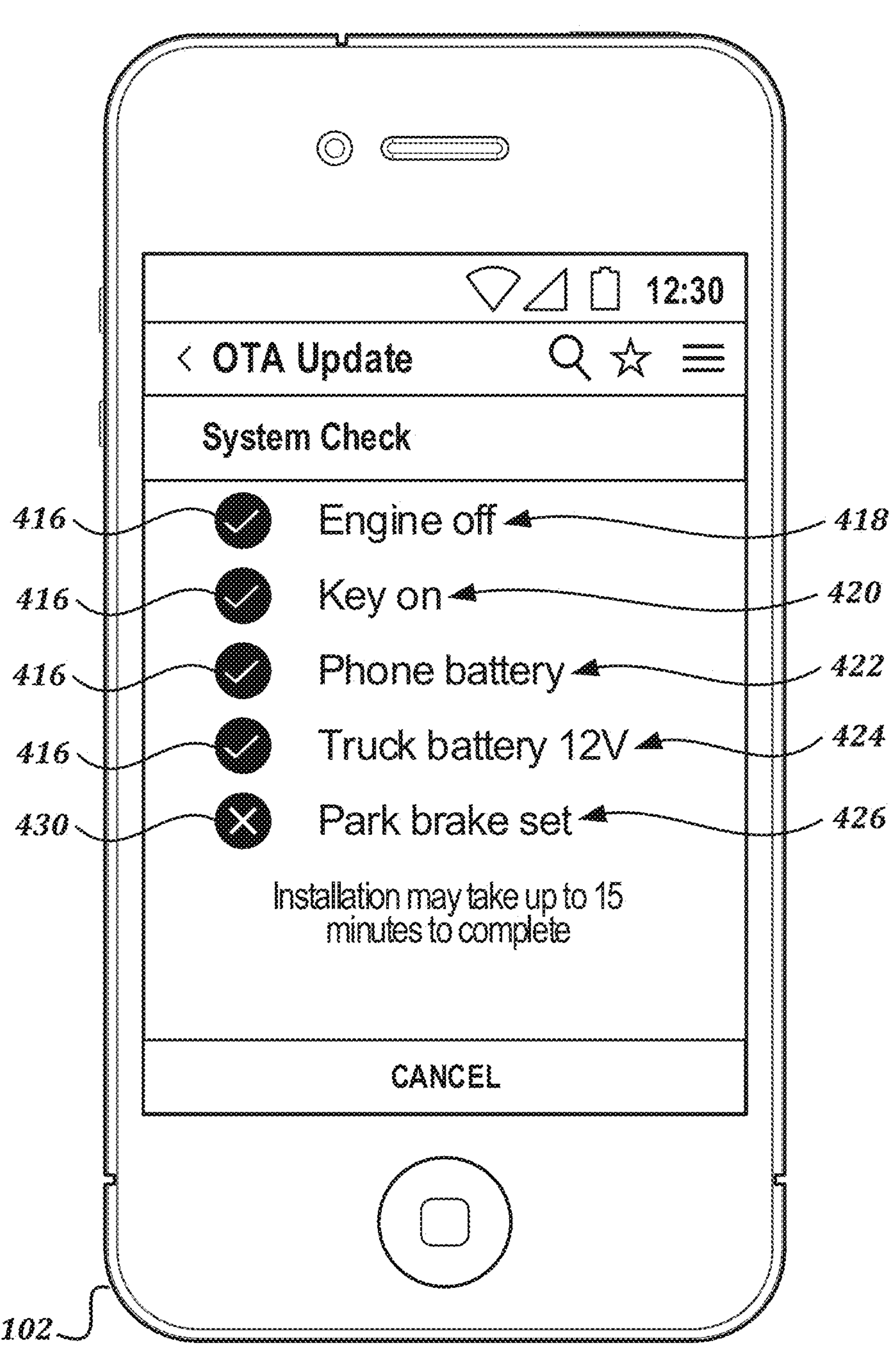

FIG. 4D illustrates an example embodiment of a mobile computing device 102 user interface displaying a failure state for one of the vehicle state conditions according to various aspects of the present disclosure. As shown, a positive indicator such as a checkmark 416 is presented next to each listed vehicle state condition or mobile device state condition that is in a success state. Furthermore, in this example, a negative indicator such as an “X” 430 is presented next to each vehicle state condition or mobile device state condition that is in a failure state. Some vehicle state conditions, such as the illustrated engine off vehicle state condition 418, may be self-explanatory with regard to how to remedy the failed state condition. For other vehicle state conditions, further information may be provided to explain how to remedy the failure state, either automatically next to the failed indicator, or upon tapping on the negative indicator. In this example, the interface element for initiating the software update 426 (e.g., the “INSTALL” user interface element) is not displayed because of the presence of at least one failure state. Alternatively, in some embodiments, the interface element for initiating the software update 426 may be present in the interface illustrated in FIG. 4D, but disabled.

Although this example displays checkmarks and “X” indicators as illustrating the success state and the failure state, respectively, it is understood that in some embodiments other techniques may be used to indicate success and failure, including but not limited to different colors, different shapes, or organization of indicators into different areas or groups.

Returning to FIG. 3C, the method 300 then proceeds to decision block 332, where a determination is made regarding whether the vehicle state conditions indicate that the vehicle 106 is ready for an update. In some embodiments, the determination at decision block 332 is made by the update processing module 206, because the result is a change in the interface presented by the mobile computing device 102. Alternatively, in some embodiments, the determination at decision block 332 is made by the user processing module 208 or the communication relay module 210, and a result of the determination is transmitted to the update processing module 206. If the vehicle state conditions do not indicate that the vehicle 106 is ready for an update, then the result of decision block 332 is NO, and the method 300 returns to terminal B to recheck the vehicle state conditions. Otherwise, if all of the vehicle state conditions indicate that the vehicle 106 is ready for an update, then the result of decision block 332 is YES, and the method 300 proceeds to block 334. In some embodiments, all of the vehicle state conditions presented by the mobile computing device 102 must be met in order to indicate that the vehicle 106 is ready for an update. In some embodiments, there may be only a single vehicle state condition. In some embodiments, some of the vehicle state conditions may not be critical for proceeding to perform an update, and in such embodiments, less than all of the vehicle state conditions may need to be met for the result of decision block 332 to be YES. In some embodiments, a patterned sequence of vehicle state conditions may indicate that the vehicle 106 is ready for an update.

At block 334, the update processing module 206 presents an interface element for initiating the software update. FIG. 4C also illustrates such an interface element, which includes the text “Install” and allows the user to tap to actuate the element. Though a button interface element is illustrated in FIG. 4C, any suitable interface element, including but not limited to a slide bar, a toggle switch, and a toggle switch/button combination may be used. Returning to FIG. 3C, at block 336, the update processing module 206 detects actuation of the interface element and transmits a command to the server computing system 104 to initiate the software update.

At block 338, the communication relay module 210 transmits the command to the OTA updater device 108, which receives the command, conducts the software update process, and transmits a signal indicating a result to the server computing system 104. In some embodiments, the OTA updater device 108 may separately confirm the vehicle state conditions allow the software update process to be conducted, in order to add an additional level of safety assurance. The OTA updater device 108 may use any suitable technique for applying the update to the updatable component 110. For example, the OTA updater device 108 may transmit the software update or a portion thereof to the updatable component 110 via the vehicle communication bus, and the updatable component 110 may use it to update software stored on a computer-readable medium of the updatable component 110. As another example, the OTA updater device 108 may directly access the computer-readable medium via the vehicle communication bus, and may itself update the stored information on the computer-readable medium.

At block 340, the communication relay module 210 transmits the result to the mobile computing device 102. In some embodiments, the result may indicate a success of the software update or a failure of the software update, and may include separate results for separate software updates and/or updatable components 110. In some embodiments, intermediate results, such as a predicted amount of time before the software update is completed, or a percentage of the software update that has currently been completed, may be transmitted by the OTA updater device 108 and relayed to the mobile computing device 102 by the communication relay module 210 in order to present a progress indication to the operator during application of the software update.

Figure 4E:
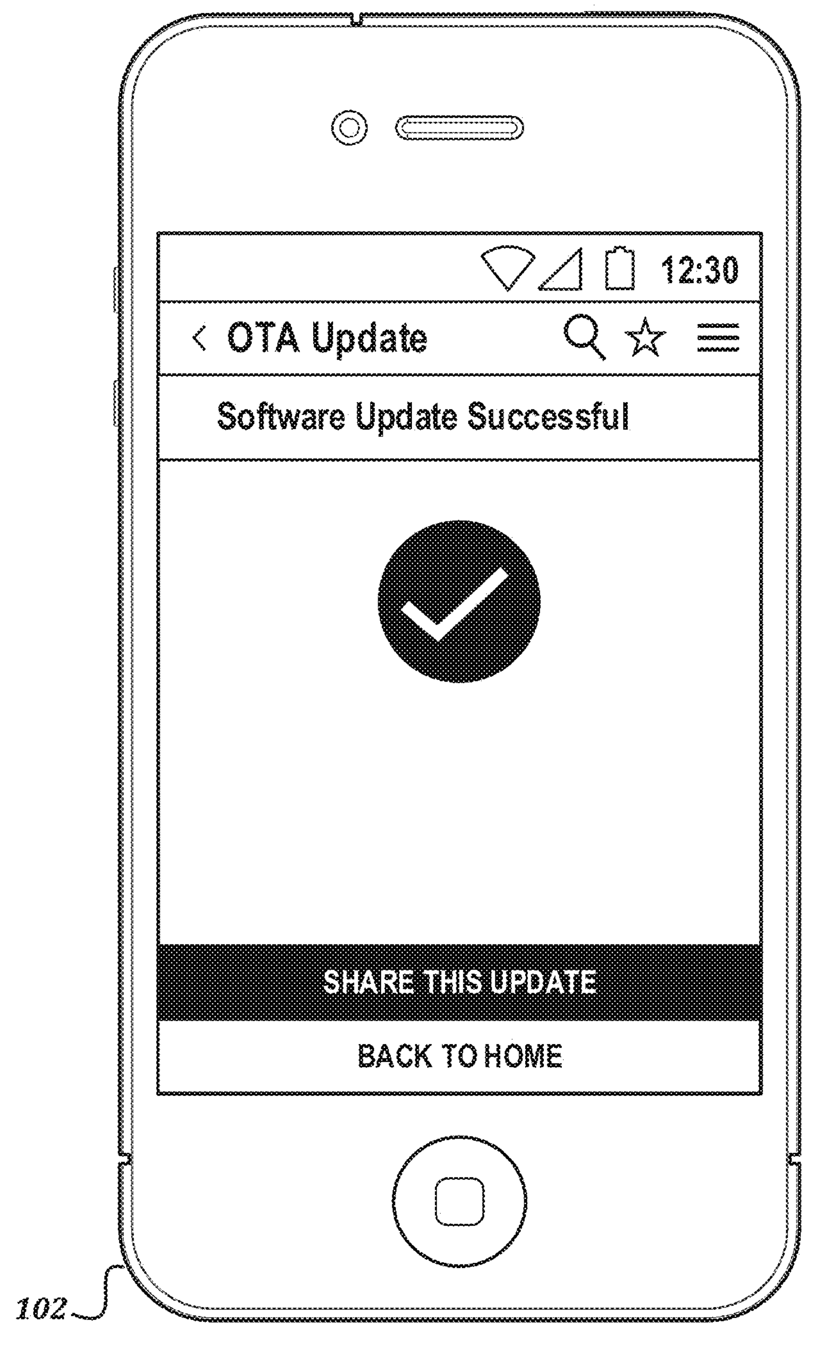

The method 300 then proceeds to a decision block 341, where a determination is made by the update processing module 206 regarding whether the software update was successful based on the result received from the vehicle 106 via the communication relay module 210. In some embodiments, the determination may be made by the communication relay module 210 or the user processing module 208 and transmitted to the update processing module 206. If the result indicates that the software update was successful, then the result of decision block 341 is YES, and the method 300 proceeds to block 342, where the update processing module 206 presents a success notification. In addition, the server computing system 104 may update the appropriate vehicle record in the vehicle data store 212 to indicate that the software update was successfully installed. Accordingly, a future vehicle status list such as the list presented in block 314 will include accurate information regarding the software updates that have been applied to the vehicle 106. After presentation of the success notification, the method 300 proceeds to an end block and terminates. FIG. 4E illustrates an example embodiment of an interface presented by a mobile computing device 102 that shows such a success notification according to one or more aspects of the present disclosure.

Returning to decision block 341 of FIG. 3C, if the result indicated that the software update was not successful, then the result of decision block 341 is NO, and the method 300 proceeds to block 344, where the update processing module 206 presents a failure notification. In some embodiments, the failure notification may include a status message that indicates what portion of the software update failed and why. In some embodiments, the failure notification may indicate to the operator that a retry of the software update will be automatically attempted one or more times. In some embodiments, the failure notification may provide an interface element that gives the operator the option to choose to manually retry the software update.

Figure 4F:
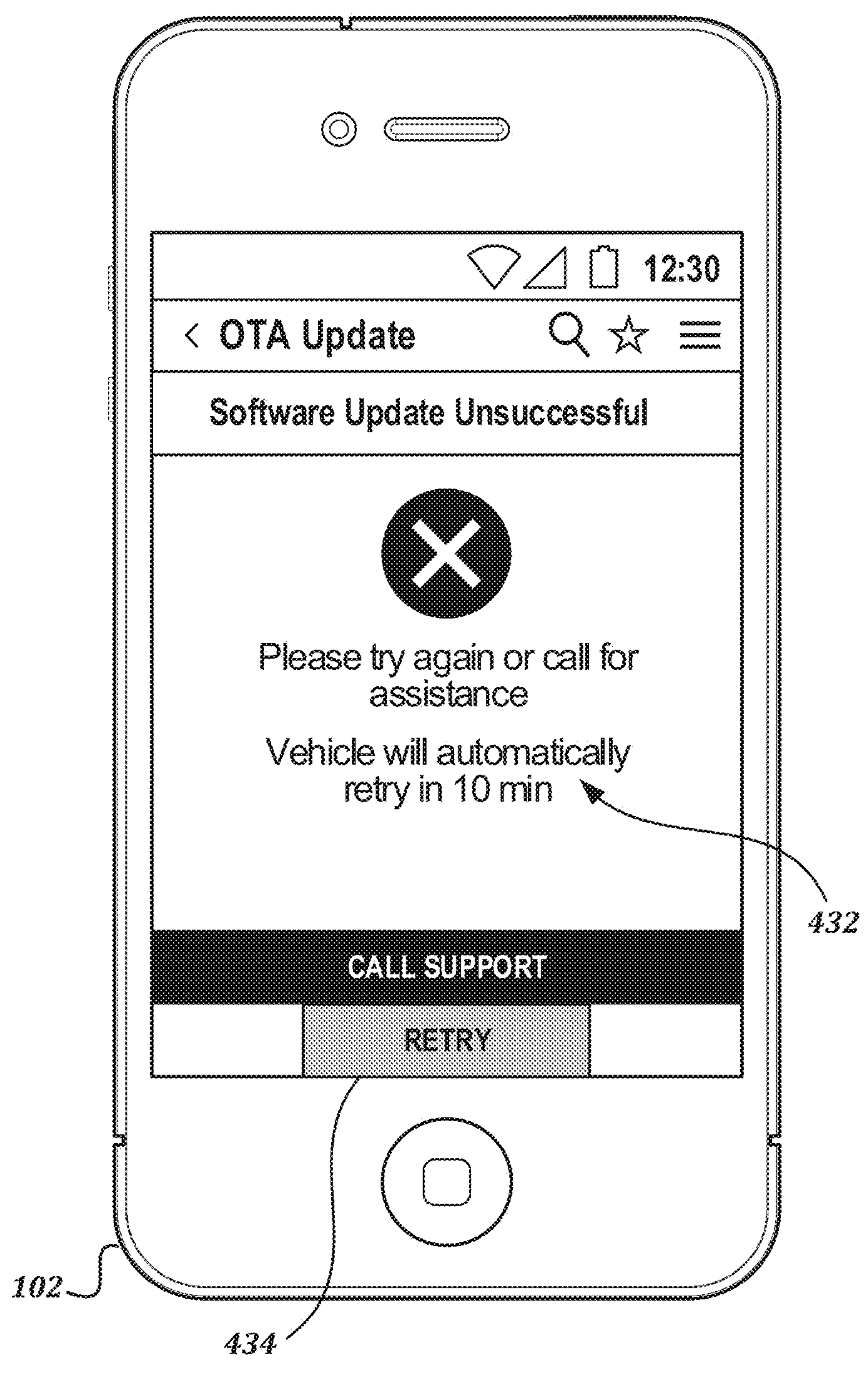

FIG. 4F illustrates an example embodiment of an interface presented by a mobile computing device 102 that shows a failure notification according to one or more aspects of the present disclosure. As shown, the interface displays an indication 432 that the update was unsuccessful and that the vehicle 106 will automatically retry the software update after a predetermined time period. An interface element 434 is also provided to allow the user to request an immediate retry. In some embodiments, the automatic retry may be performed for a predetermined number of attempts before requiring confirmation for further retries from the user.

Returning to FIG. 3C, the method 300 then proceeds to decision block 346, where a determination is made based on an option chosen by the operator in the failure notification interface. If the operator chooses to retry the software update then the result of decision block 346 is YES, and the method 300 returns to block 334 to attempt to retry the update. Otherwise, if the operator chooses not to retry the software update, then the result of decision block 346 is NO. In some embodiments, not receiving a command to retry within a given time period may cause the OTA updater device 108 to automatically retry the software update. The method 300 then proceeds to an end block and terminates. In some embodiments, upon reaching the end block, the record indicating that the mobile computing device 102 is interacting with the vehicle 106 may be deleted.

FIG. 5 is a flowchart that illustrates an example embodiment of a method 500 of registering a vehicle to be associated with a user for controlling software updates according to one or more aspects of the present disclosure. At block 502, a user activates an update processing module 206 of a mobile computing device 102. In an example, this may involve the user launching an application on the mobile computing device 102 that provides the functionality of the update processing module 206. At block 504, the user provides login credentials to the update processing module 206, and the update processing module 206 transmits the login credentials to the server computing system 104. At block 506, a user processing module 208 of the server computing system 104 verifies the login credentials. The details of blocks 502-506 are similar to the details described above in blocks 308-312 of FIG. 3A, and so are not repeated here for the sake of brevity.

At block 508, the update processing module 206 detects actuation of an interface control for adding a vehicle and prompts the user to obtain a unique identifier of the vehicle 106.

At block 510, the user enters the unique identifier of the vehicle 106 by manual entry (such as by using a keyboard) or by scanning a QR code attached to the vehicle with a camera 204 of the mobile computing device 102. Using the camera 204 to scan a QR code applied to the vehicle 106 to obtain the unique identifier of the vehicle is an example only. In some embodiments, a one-dimensional bar code may be used instead of a two-dimensional QR code. In some embodiments, the camera 204 may be used take a picture of the alphanumeric VIN or other alphanumeric identifier attached to the vehicle 106, and the unique identifier value may be obtained from the picture using optical character recognition (OCR). In some embodiments, the mobile computing device 102 may include a microphone, which allows the user to enter the unique identifier using voice input by reading off the VIN or other unique vehicle identifier.

At block 512, the update processing module 206 transmits the unique identifier of the vehicle 106 to the server computing system 104. At block 514, the user processing module 208 registers the vehicle 106 with the user in the vehicle data store 212 using the unique identifier. To register the vehicle 106, the user processing module 208 creates a record within the vehicle data store 212 that associates the vehicle 106 with the user. The record may also store other information about the vehicle 106, such as the status of software updates as described above. After registration, the vehicle 106 will be added to the vehicle list as described herein, enabling the user to initiate software updates for the registered vehicle 106. The method 500 then proceeds to an end block and terminates.

Figure 6:
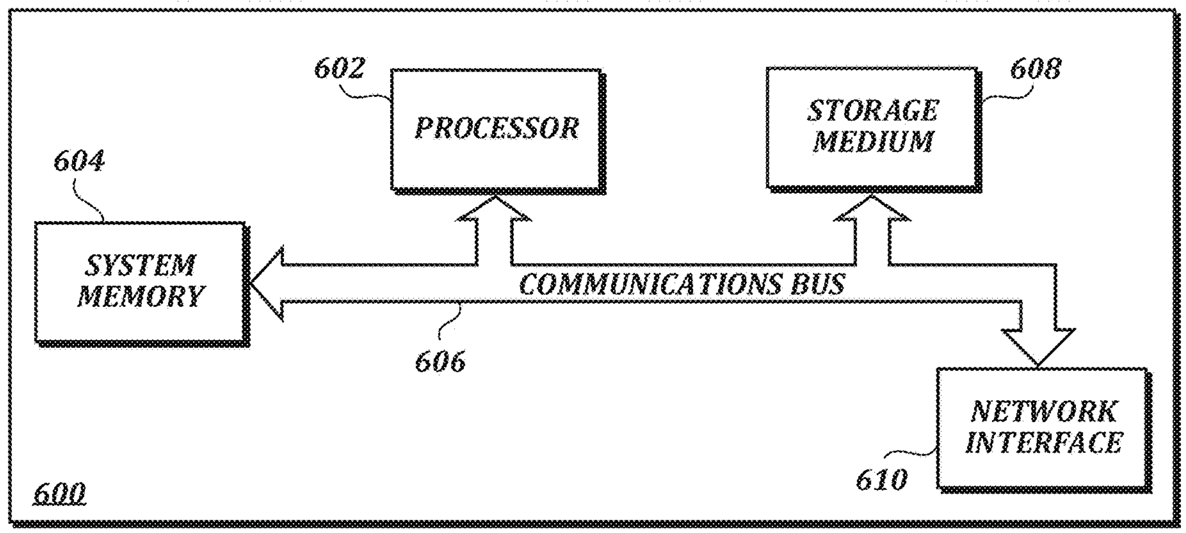
FIG. 6 is a block diagram that illustrates one or more aspects of a representative computing device 600 appropriate for use with embodiments of the present disclosure.

FIG. 6 is a block diagram that illustrates aspects of a representative computing device 600 appropriate for use with embodiments of the present disclosure. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as Wi-Fi, 2G, 3G, LTE, WiMAX, Bluetooth, and/or the like.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or non-removable, implemented using any technology capable of storing information such as, but not limited to, a hard drive, solid state drive, flash memory, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 604 and storage medium 608 depicted in FIG. 6 are merely examples of computer-readable media. Computer-readable media can be used to store data for use by programs.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 600 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer-readable storage medium associated with a computing device.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A method of causing an over-the-air updater device of a vehicle to initiate a software update, the method comprising:

receiving, by an update server, a notification from the over-the-air updater device that a software update has been downloaded;

receiving, by the update server, a first message indicating a plurality of vehicle state conditions from the over-the-air updater device, wherein the plurality of vehicle state conditions are collected by the over-the-air updater device from one or more components of the vehicle, and wherein the plurality of the vehicle state conditions indicate a current state of the vehicle and the plurality of the vehicle state conditions include: a wireless signal strength at the vehicle, a battery level of the vehicle and an engine status of the vehicle;

transmitting, by the update server and in response to receiving the notification and the first message, a second message to a mobile computing device indicating the plurality of vehicle state conditions and the notification that the software update has been downloaded;

receiving, by the update server, a plurality of mobile-device state conditions from the mobile computing device, the plurality of mobile-device state conditions including at least a wireless-signal-strength value of the mobile computing device and a battery-level value of the mobile computing device;

verifying, at the update server, that each of the plurality of vehicle state conditions indicating the current state of the vehicle meets one or more vehicle threshold conditions, including checking at the update server located remotely from the vehicle that the current state of the vehicle is in a condition to receive the software update by verifying that the wireless signal strength at the vehicle is adequate, verifying that the battery level of the vehicle is adequate, and verifying that the engine status indicates that an engine of the vehicle is running;

verifying, by the update server, that the mobile computing device is the only device transmitting instructions for the over-the-air updater device to perform the software update on the vehicle, wherein the update server stores a record of devices interacting with the over-the-air updater device, and wherein verifying that the mobile computing device is the only device transmitting instructions for the over-the-air updater device includes verifying that no other device, other than the mobile computing device, is included in the record and verifying that no other device, other than the mobile computing device is transmitting the instruction to initiate the software update on the vehicle; and presenting a list of states, including the plurality of vehicle state conditions and the plurality of mobile-device state conditions, on the mobile computing device; and upon verifying that:

(i) each of the plurality of vehicle state conditions meets one or more vehicle threshold conditions, (ii) each of the one or more mobile-device state conditions meet one or more mobile threshold conditions, and (iii) the mobile computing device is the only device transmitting instructions for the over-the air updater device to perform the software update on the vehicle, presenting checkmarks adjacent to each of the list of states on the mobile computing device, the checkmarks indicating successful verification of each of the list of states; and upon receiving, by the update server, an instruction from the mobile computing device to initiate the software update, transmitting, by the update server, the instruction to the over-the-air updater device to initiate the software update.

2. The method of claim 1, wherein at least one of the plurality of vehicle state conditions of the first message indicate that the vehicle is not ready for the software update, and wherein the method further comprises:

receiving a third message indicating one or more updated vehicle state conditions from the over-the-air updater device, wherein the one or more updated vehicle state conditions indicate that the vehicle is ready for the software update; and transmitting a fourth message indicating the one or more updated vehicle state conditions to the mobile computing device;

wherein the instruction from the mobile computing device to initiate the software update is received by the update server after transmitting the fourth message.

3. The method of claim 1, further comprising:

receiving, by the update server, user credentials from the mobile computing device for authenticating a user of the mobile computing device; and authenticating, by the update server, the user based on the user credentials.

4. The method of claim 3, further comprising transmitting, by the update server, a list of vehicles associated with the user to the mobile computing device, wherein the list of vehicles includes vehicle status information.

5. The method of claim 1, further comprising:

receiving, by the update server, a fifth message indicating a status of the software update from the over-the-air updater device; and transmitting, by the update server, a sixth message indicating the status of the software update to the mobile computing device.

6. The method of claim 1, further comprising:

transmitting, by the update server to the mobile computing device, instructions to perform a triggering action at the vehicle, wherein the triggering action includes actuating a device within the vehicle;

receiving, at the update server, a vehicle state condition from the vehicle;

based on the vehicle state condition, determining, at the update server, that the triggering action was completed within the vehicle; and upon determining that the triggering action was completed within the vehicle, proceeding with transmitting the instruction to the over-the-air updater device to initiate the software update.

7. A over-the-air updater system, comprising:

a processor; and a memory storing computer executable instructions that, when executed by the processor, perform operations, comprising:

receiving, by an update server, a notification from an over-the-air updater device of a vehicle that a software update has been downloaded;

receiving, by the update server, a first message indicating a plurality of vehicle state conditions from the over-the-air updater device, wherein the plurality of vehicle state conditions are collected by the over-the-air updater device from one or more components of the vehicle, and wherein the plurality of vehicle state conditions indicate a current state of the vehicle and the plurality of the vehicle state conditions include: a wireless signal strength at the vehicle, a battery level of the vehicle and an engine status of the vehicle;

transmitting, by the update server and in response to receiving the notification and the first message, a second message to a mobile computing device indicating the plurality of vehicle state conditions and the notification that the software update has been downloaded;

receiving, by the update server, a plurality of mobile-device state conditions from the mobile computing device, the plurality of mobile-device state conditions including at least a wireless-signal-strength value of the mobile computing device and a battery-level value of the mobile computing device;

verifying, at the update server, that each of the plurality of vehicle state conditions indicating the current state of the vehicle meets one or more vehicle threshold conditions, including checking at the update server located remotely from the vehicle that the current state of the vehicle is in a condition to receive the software update by verifying that the wireless signal strength at the vehicle is adequate, verifying that the battery level of the vehicle is adequate, and verifying that the engine status indicates that an engine of the vehicle is running;

verifying, by the update server, that the mobile computing device is the only device transmitting instructions for the over-the-air updater device, wherein the update server stores a record of devices interacting with the over-the-air-updater device to perform the software update on the vehicle, and wherein verifying that the mobile computing device is the only device transmitting instructions for the over-the-air updater device includes verifying that no other device, other than the mobile computing device, is included in the record and verifying that no other device, other than the mobile computing device is transmitting the instruction to initiate the software update on the vehicle;

presenting a list of states, including the plurality of vehicle state conditions and the plurality of mobile-device state conditions, on the mobile computing device; and upon verifying that:

(i) each of the plurality of vehicle state conditions meets one or more vehicle threshold conditions, (ii) each of the mobile-device state conditions meets one or more mobile threshold conditions, and (iii) the mobile computing device is the only device transmitting instructions for the over-the air updater device to perform the software update on the vehicle, presenting checkmarks adjacent to each of the list of states on the mobile computing device, the checkmarks indicating successful verification of each of the list of states; and upon receiving, by the update server, an instruction from the mobile computing device to initiate the software update, transmitting, by the update server, the instruction to the over-the-air updater device to initiate the software update.

8. The over-the-air updater system of claim 7, wherein at least one of the plurality of vehicle state conditions of the first message indicate that the vehicle is not ready for the software update.

9. The over-the-air updater system of claim 8, further comprising receiving, by the update server, a third message indicating one or more updated vehicle state conditions from the over-the-air updater device, wherein the one or more updated vehicle state conditions indicate that the vehicle is ready for the software update.

10. The over-the-air updater system of claim 9, further comprising transmitting, by the update server, a fourth message indicating the one or more updated vehicle state conditions to the mobile computing device.

11. The over-the-air updater system of claim 10, wherein the instruction from the mobile computing device to initiate the software update is received by the update server after transmitting the fourth message.

12. The over-the-air updater system of claim 7, wherein the plurality of vehicle state conditions further include whether a human-machine interface (HMI) device of the vehicle has been actuated for at least a threshold amount of time.

13. The over-the-air updater system of claim 7, further comprising receiving, by the update server, user credentials from the mobile computing device for authenticating a user of the mobile computing device.

14. The over-the-air updater system of claim 13, further comprising authenticating, by the update server, the user based on the user credentials.

15. The over-the-air updater system of claim 7, further comprising transmitting, by the update server, a list of vehicles associated with the user to the mobile computing device, wherein the list of vehicles includes vehicle status information.

16. The over-the-air updater system of claim 7, further comprising receiving, by the update server, a fifth message indicating a status of the software update from the over-the-air updater device.

17. The over-the-air updater system of claim 16, further comprising transmitting, by the update server, a sixth message indicating the status of the software update to the mobile computing device.

18. The over-the-air updater system of claim 7, further comprising receiving, by the update server, a unique identifier of the vehicle from the mobile computing device.

19. The over-the-air updater system of claim 18, wherein, the instruction to the over-the-air updater device to initiate the software update is transmitted by the server after receiving the unique identifier of the vehicle.

20. The over-the-air updater system of claim 19, wherein receiving, by the update server, the unique identifier of the vehicle comprises receiving an image captured by the mobile computing device, wherein the image comprises one of:

a QR code; or a Vehicle Identification Number (VIN).

* * * * *